US007302720B2

(12) United States Patent
Flannery et al.

(10) Patent No.: US 7,302,720 B2
(45) Date of Patent: Dec. 4, 2007

(54) ONE DIRECTION BUTTON MECHANISM

(75) Inventors: Mark A Flannery, Lakeville, MN (US); Nathan A Dusheck, Hammond, WI (US)

(73) Assignee: Mark A. Flannery, Lakeville, MN (US)

(*) Notice: Subject to any disclaimer, the term of this patent is extended or adjusted under 35 U.S.C. 154(b) by 0 days.

(21) Appl. No.: 11/603,288

(22) Filed: Nov. 20, 2006

(65) Prior Publication Data

US 2007/0101494 A1 May 10, 2007

Related U.S. Application Data

(60) Division of application No. 10/820,358, filed on Apr. 7, 2004, now Pat. No. 7,137,158, which is a continuation-in-part of application No. 10/652,296, filed on Aug. 29, 2003, now Pat. No. 6,952,846.

(60) Provisional application No. 60/407,369, filed on Aug. 30, 2002.

(51) Int. Cl.
*A47C 21/08* (2006.01)
*F16B 7/16* (2006.01)

(52) U.S. Cl. .................... 5/429; 5/428; 5/426; 403/329

(58) Field of Classification Search ............. 403/109.3, 403/378, 109.6, 329; 5/429, 428, 426, 425
See application file for complete search history.

(56) References Cited

U.S. PATENT DOCUMENTS 3,097,370 A * 7/1963 Murcott ......................... 5/429
3,239,255 A * 3/1966 Murcott ...................... 403/329
3,289,223 A * 12/1966 Oja et al. ...................... 5/428
3,474,473 A * 10/1969 Hannaberg ...................... 5/426
3,603,628 A * 9/1971 Smith et al. ................ 403/329
4,318,228 A * 3/1982 Kimura ....................... 33/809
4,391,545 A * 7/1983 Zummer ..................... 403/189
4,415,292 A * 11/1983 Alperson .................... 403/246
4,431,331 A * 2/1984 Brody ........................ 403/189
4,711,595 A * 12/1987 Magid et al. ............... 403/108
5,038,430 A * 8/1991 Bly .............................. 5/425
5,143,476 A * 9/1992 Pruis .......................... 403/328

(Continued)

*Primary Examiner*—Robert G. Santos

(57) ABSTRACT

A bed rail structured to minimize the gap between the mattress and the bed rail and including a leg portion and a rail portion. The rail portion extends upwardly on a first side of the mattress to extend beyond the sleeping surface of the mattress and prevent a person from rolling out of bed. The leg portion is sandwiched between the mattress and the box spring and extends toward a second side of the mattress. In one embodiment, the leg portion includes a distal end that is engaged to the second side of at least one of the mattress and box spring such that the distal end and rail portion hug the mattress. In another embodiment, the bed rail includes a relatively rigid cover depending from an upper portion of the rail portion to the sleeping surface so as to cover a gap that may exist between the first side of the mattress and the rail portion. In still another embodiment, the rail portion is set at an acute angle relative to the leg portion so as to tend to close off any gap between the first side of the mattress and the rail portion. In another embodiment, the wall of the rail portion may include tubing and the rail portion may be drawn against the bed with a strap extending about the periphery of the bed.

2 Claims, 24 Drawing Sheets

U.S. PATENT DOCUMENTS

| | | | | |
|---|---|---|---|---|
| 6,134,731 | A * | 10/2000 | Thom et al. | 5/662 |
| 6,401,280 | B1 * | 6/2002 | Baker | 5/662 |
| 6,725,476 | B2 * | 4/2004 | Macari | 5/426 |
| 6,952,846 | B2 * | 10/2005 | Flannery et al. | 5/425 |
| 6,959,463 | B2 * | 11/2005 | Macari | 5/425 |
| 7,055,193 | B2 * | 6/2006 | Macari et al. | 5/425 |
| 7,080,419 | B2 * | 7/2006 | Macari | 5/426 |
| 7,103,928 | B1 * | 9/2006 | Childs | 5/426 |
| 7,137,158 | B2 * | 11/2006 | Flannery et al. | 5/425 |
| 7,150,053 | B2 * | 12/2006 | Macari | 5/426 |
| 7,178,184 | B2 * | 2/2007 | Flannery et al. | 5/425 |
| 7,181,788 | B2 * | 2/2007 | Flannery et al. | 5/430 |
| 7,197,779 | B2 * | 4/2007 | Shalikar | 5/426 |
| 7,237,285 | B2 * | 7/2007 | Brewin et al. | 5/426 |
| 2002/0078502 | A1 * | 6/2002 | Baker | 5/429 |
| 2004/0040089 | A1 * | 3/2004 | Flannery et al. | 5/425 |
| 2004/0187209 | A1 * | 9/2004 | Flannery et al. | 5/425 |
| 2004/0250347 | A1 * | 12/2004 | Brewin et al. | 5/426 |
| 2005/0229310 | A1 * | 10/2005 | Flannery et al. | 5/430 |
| 2006/0026759 | A1 * | 2/2006 | Flannery et al. | 5/426 |
| 2007/0101494 | A1 * | 5/2007 | Flannery et al. | 5/430 |

* cited by examiner 534
518
522
540
551
210
514
508
525
516
520
552
572
552
550
208
518
522
551

ONE DIRECTION BUTTON MECHANISM

This application is a division of, and claims the benefit under 35 U.S.C. § 120 of, U.S. patent application Ser. No. 10/820,358 filed Apr. 7, 2004 now U.S. Pat. No. 7,137,158, which was a continuation-in-part application of U.S. patent application Ser. No. 10/652,296 filed Aug. 29, 2003 now U.S. Pat. No. 6,952,846, which claimed the benefit thereof under 35 U.S.C. § 120. U.S. patent application Ser. No. 10/652,296 filed Aug. 29, 2003 claimed the benefit of U.S. Provisional Patent Application No. 60/407,369 filed Aug. 30, 2002 under 35 U.S.C. § 119(e). U.S. patent application Ser. No. 10/820,358 filed Apr. 7, 2004, U.S. patent application Ser. No. 10/652,296 filed Aug. 29, 2003 and U.S. Provisional Patent Application No. 60/407,369 filed Aug. 30, 2002 are hereby incorporated by reference in their entireties.

FIELD OF THE INVENTION

The present invention relates particularly to a bed rail and specifically to a bed rail that hugs the mattress to maximize a tight fit between the rail portion and the side of a mattress and to minimize the chance that a child can fall between the rail portion of the bed rail and the side of the mattress.

BACKGROUND OF THE INVENTION

A bed rail is a structure engaged to the side of a bed to prevent a person, especially a child, from rolling out of bed and falling to the floor. A bed rail includes a leg portion that is sandwiched between the mattress and box spring. A bed rail further includes a rail portion that extends from the leg portion and upwardly to and beyond the sleeping surface of the bed. The rail portion forms the rail that prevents the child from rolling out of bed.

A bed rail is intended to provide a safe sleeping environment, particularly for a child. However, the leg portion tends to work its way out from between the mattress and the box spring. As the leg portion works its way out, a gap is created between the side of the mattress and the rail portion of the bed rail. Children have rolled off the bed, have fallen into the gap, and have been entrapped between the bed rail and side of the mattress.

SUMMARY OF THE INVENTION

A feature of the present invention is the provision in a bed rail having a rail portion confronting a first side of a bed and extending upwardly beyond a sleeping surface of the bed and a leg portion extending from the rail portion and running toward a second side of a bed, of a member engaged to the leg portion and adapted for engaging the second side of the bed such that the member and rail portion hug the bed therebetween to minimize a creation of a gap between the rail portion and the first side of the bed.

Another feature of the present invention is the provision in a bed rail having a rail portion confronting a first side of a bed and extending upwardly beyond a sleeping surface of the bed and a leg portion extending from the rail portion and running toward a second side of a bed, of a cover depending from an upper portion of the rail portion and extending over a portion of the sleeping surface of the bed to cover any gap that may be created between the rail portion and the first side of the mattress.

A feature of the present invention is the provision in a bed rail having a rail portion confronting a first side of a bed and extending upwardly beyond a sleeping surface of the bed and a leg portion extending from the rail portion and running toward a second side of a bed, of the rail portion being set at an angle relative to the leg portion so that the rail portion confronts as much as possible the edge of the mattress where the sleeping surface joins the first side of the mattress.

An advantage of the present bed rail is safety. The embodiments of the invention have means for minimizing the creation of the gap between the rail portion and the first side of the mattress.

Another advantage of the present invention is that the bed rail is easy to set up so as to provide a tight fit between the rail portion and the first side of the mattress.

Another advantage of the present invention is that the bed rail is difficult to set up when an attempt is made to create a less tight fit between the rail portion and the first side of the mattress.

Another advantage of the present invention is that the bed rail includes a compact configuration for storage.

DESCRIPTION

Figure 1A:
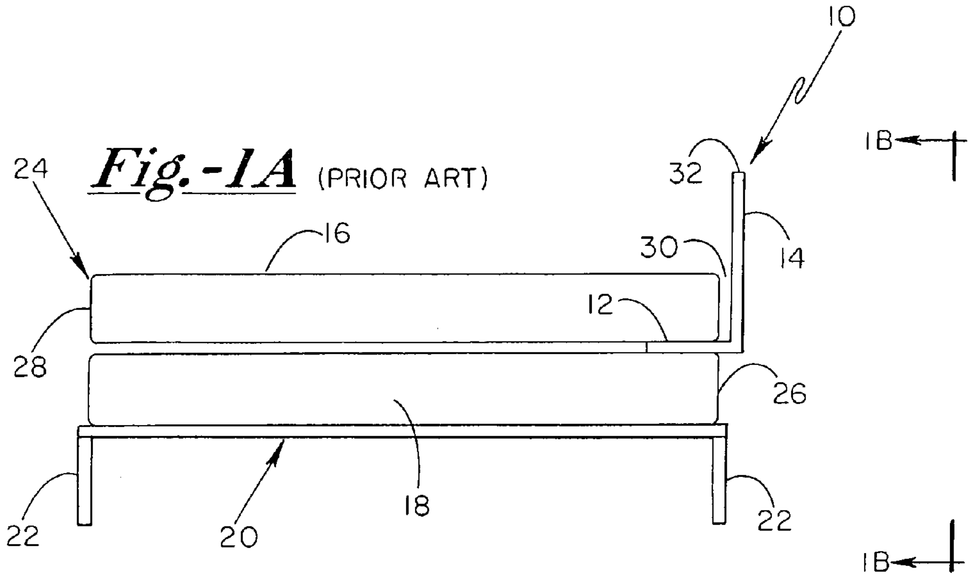
Fig.-1A (PRIOR ART)
FIG. 1A is a partially section and diagrammatic view of a mattress, box spring, frame, and a prior art bed rail sandwiched between the mattress and the box spring.

FIG. 1A shows a prior art bed rail 10 having a leg 12 and a rail portion 14. The leg 12 is sandwiched between a mattress 16 and a box spring 18. The box spring 18 is set on a frame 20 having legs 22. The mattress 16, box spring 18, frame 20 and legs 22 form as a whole a bed 24 having a first side 26 and a second side 28. The prior art bed rail 10 may tend to form a gap 30 between the rail portion 14 and the first side 26 of the bed 24.

Figure 1B:
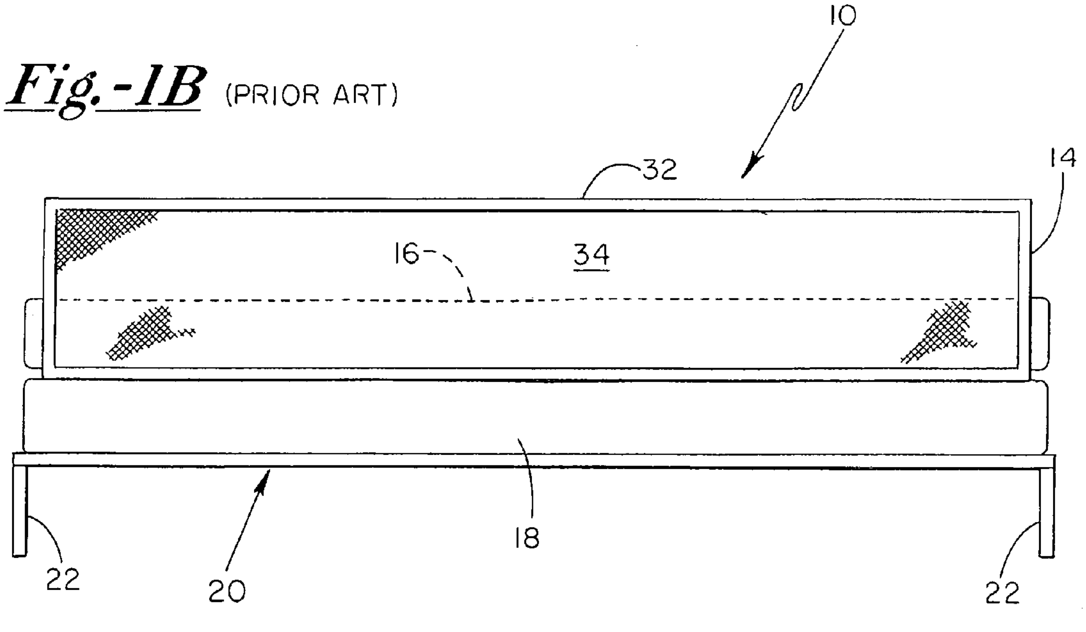
Fig.-1B (PRIOR ART)
FIG. 1B is a side diagrammatic view of the mattress, box spring, frame and prior art bed rail of FIG. 1A.

FIG. 1B shows that the prior art rail portion 14 includes a frame 32 and a resilient wall 34 engaged to the frame 32 wherein the resilient wall 34 is formed of a resilient sheet material. The wall 34 may alternatively be rigid if desired. The wall 34 may include several rigid components. The wall 34 may include tubing. The wall 34 may be a relatively thick plastic sheet or wall or wall-like member.

Figure 2A:
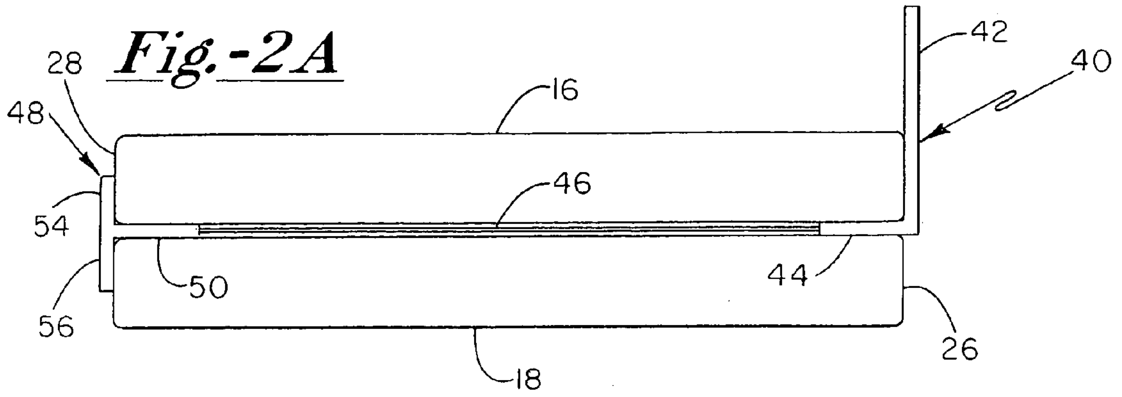
FIG. 2A is a partially section and diagrammatic view of a hugging bed rail of the present invention sandwiched between a mattress and a box spring and shows a position prior to when the bed rail is tightened to hug the bed.

FIG. 2A shows one embodiment 40 of the inventive hugging bed rail. Such bed rail 40 includes a rail portion 42 pivotally engaged to a leg portion 44. The leg portion 44 is sandwiched between mattress 16 and box spring 18. The leg portion 44 is engaged to a strap or tether 46 which in turn is engaged to a counter member or cleat 48. Strap 46 is adjustable in length relative to leg portion 44 and/or relative to counter member 48 so that the rail portion 42 and counter member 48 can be drawn toward each other such that the bed rail 40 can hug the mattress 16 to draw the rail portion 42 tightly against the first side 26 of the mattress 16.

Figure 2B:
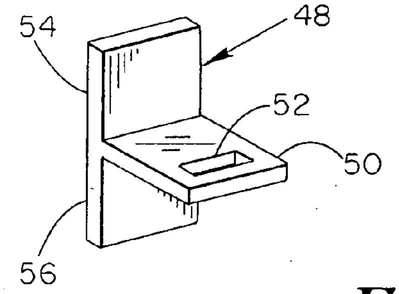
FIG. 2B shows a perspective view of one embodiment of a counter member for opposing or countering the rail portion of the bed rail and for engaging the second side of the bed.

FIG. 2B shows T-shaped counter member 48 having a base 50 that fits between mattress 16 and box spring 18 and that includes an aperture 52 for engaging strap 46. Counter member 48 further includes a first upper extension 54 for confronting the second side of the mattress 16 and a second lower extension 56 for confronting the second side of the box spring 18.

Figure 2C:
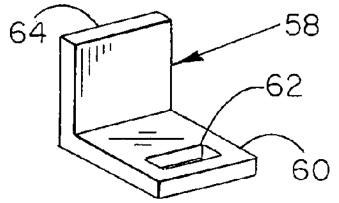
FIG. 2C shows a perspective view of another embodiment of a counter member for opposing or countering the rail portion of the bed rail and for engaging the second side of the bed.

FIG. 2C shows an L-shaped counter member 58 having a base 60 that digs in like a cleat between the mattress 16 and box spring 18. Base 60 includes an aperture 62 for engaging a strap such as strap 46. Counter member or counter 58 further includes an extension 64 that is preferably oriented upwardly so as to confront the second side 28 of mattress 16 instead of the second side 28 of box spring 18.

Figure 2D:
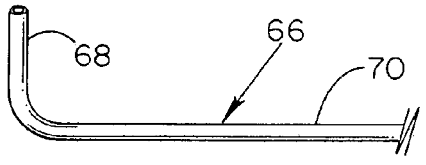
FIG. 2D shows a perspective view of still another embodiment of a counter member for opposing or countering the rail portion of the bed rail and for engaging the second side of the bed.

FIG. 2D shows another counter member 66 that includes a distal countering end 68 rounded upwardly to confront the second side 28 of mattress 16. An inner end portion 70 may be engaged to leg portion 44 such as with a strap or tether, telescoping connection members, or with an integral connection. In the case of an integral connection, the distance between the distal countering end 68 and the rail portion 42 is fixed and sized for a particular mattress such as a single, twin, queen or king-sized bed or for some other fixed size such that the rail portion 42 tightly hugs the first side 26 of the particular mattress.

Figure 2E:
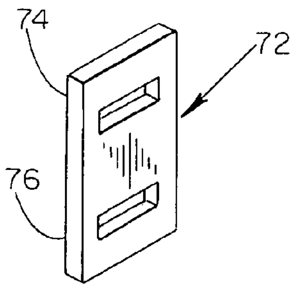
FIG. 2E shows a perspective view of yet another embodiment of a counter member for opposing or countering the rail portion of the bed rail and for engaging the second side of the bed.

FIG. 2E shows a counter member 72 having an upper portion 74 for confronting the second side 28 of mattress 16 and a lower portion 76 for confronting the second side 28 of box spring 18. Counter member 72 further includes a pair of apertures 78 for receiving a strap, such as strap 46, in a looped fashion, as shown in FIG. 2F.

Figure 2F:
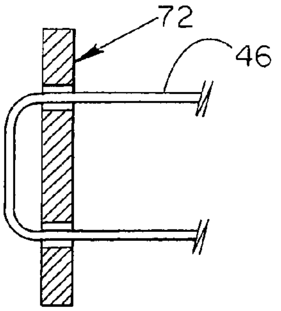
FIG. 2F is a diagrammatic view of the counter member of FIG. 2E engaging a strap which in turn engages another portion of the bed rail.

FIG. 2F shows the counter member 72 of FIG. 2E engaging strap 46. It should be noted that counter member 72 is preferably oriented such that opposing portions of strap 46 lay on top of each other when sandwiched between mattress 16 and box spring 18. However, if desired, counter member 72 can be oriented sideways such that opposing portions of strap 46 lay side by side when sandwiched between mattress 16 and box spring 18.

Figure 3A:
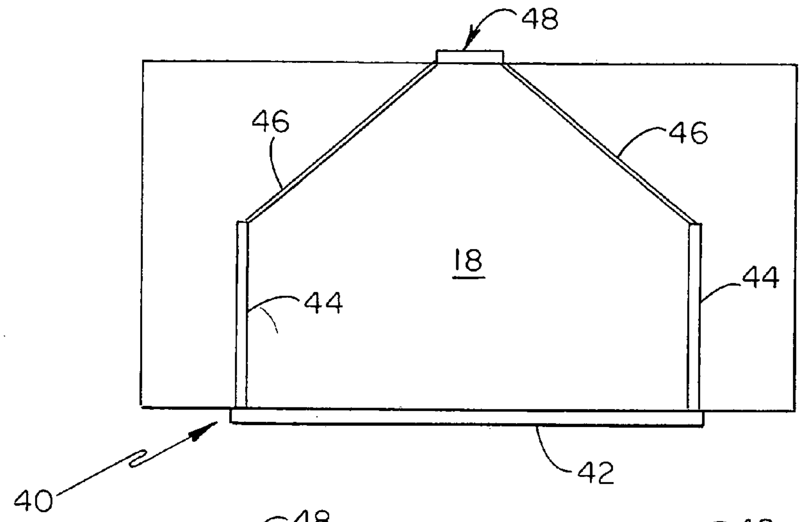
FIG. 3A is a top diagrammatic view of a bed with the mattress removed and shows a single counter member engaging the second side of the bed.

FIG. 3A shows that bed rail 40 may include two leg portions 44 sandwiched between the mattress 16 and box spring 18 and that each of the leg portions 44 may be strapped, such as with strap 46, to a counter member, such as counter member 48. In such a case, aperture 52 of base 50 may run at 90 degrees relative to the position shown in FIG. 2B and one strap may run from leg portion 44 through aperture 52 to leg portion 44.

Figure 3B:
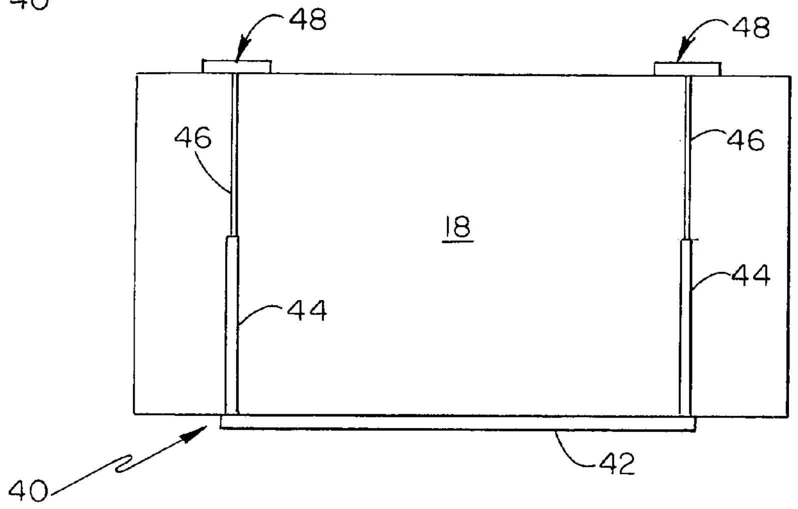
FIG. 3B is a top diagrammatic view of a bed with the mattress removed and shows a pair of counter members engaging the second side of the bed.

FIG. 3B shows that each of the leg portions 46 can be engaged to a respective strap 46 which in turn is engaged to a respective counter member 48.

Figure 3C:
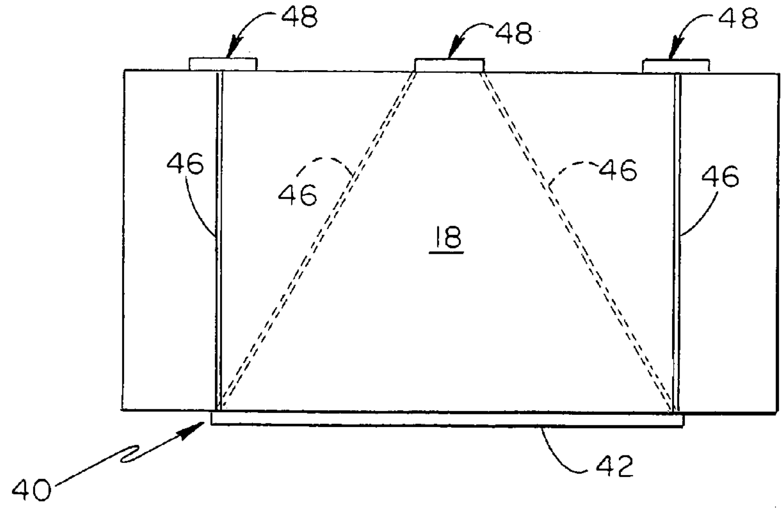
FIG. 3C is a top diagrammatic view of a bed with the mattress removed and shows a "leg-less" bed rail with two embodiments of counter members where a rigid portion of the leg is deleted and where the "leg" may include only a strap running from the rail portion to the counter member.

FIG. 3C shows a "leg-less" bed rail 40 where the legs 44 (or at least the rigid portions or tubular portions of the legs 44) have been removed. Instead, the straps 46 extend directly or substantially directly from the rail portion 42 to the counter or counters 48. In the embodiment of FIG. 3C, a single counter 48 or dual counters 48 may be used.

Figure 4A:
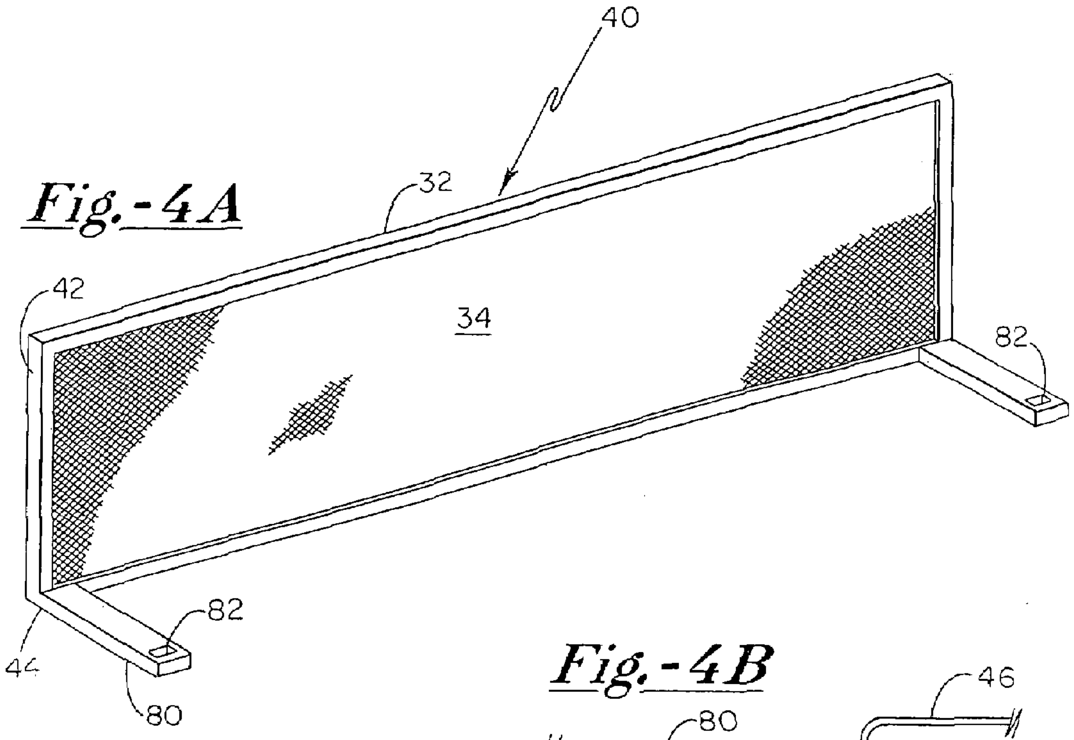
FIG. 4A is a diagrammatic perspective view of a bed rail of the present invention wherein the distal ends of the leg portion of the bed rail has apertures for engaging straps that in turn engage counter members.

FIG. 4A shows that the bed rail 40 can have the frame 32 and resilient wall 34 formed of a resilient sheet material. FIG. 4A further shows that the leg portions 44 have distal ends 80 with apertures 82 for engaging straps or tethers such as straps 46. FIG. 4A shows the strap engaging apertures 82 running vertically.

Figure 4B:
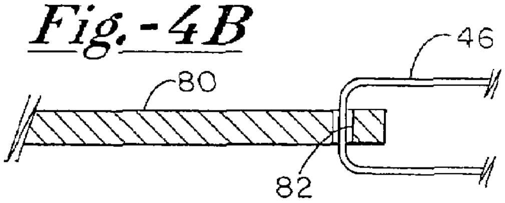
FIG. 4B is a diagrammatic view of one embodiment of a distal end for the bed rail of FIG. 4A.

FIG. 4B shows a detail view of distal end 80, aperture 82 and strap 46.

Figure 4D:
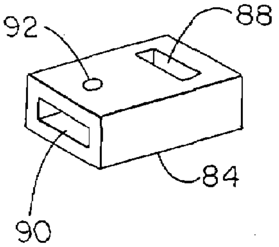
FIG. 4D is a perspective view of the distal end of FIG. 4C.
Figure 4C:
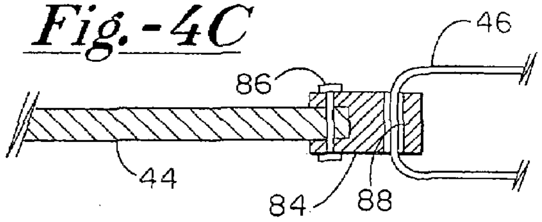
FIG. 4C is a diagrammatic view of another embodiment of a distal end for the bed rail of FIG. 4A.

FIG. 4C shows another embodiment for a distal end of leg portion 44 where a distal end 84 is engaged to leg portion 44 via a pin 86 such as a rivet. Distal end 84 has a slot 88 for engaging strap 46. Distal end 84 is a piece for modifying a prior art bed rail, such as bed rail 10. One kit for modifying a prior art bed rail may include a strap, where the strap is engaged to prior art leg portion 12 and then wound about the mattress 16 or box spring 18 or tied to a portion of frame 20 or leg 22. Another kit for modifying a prior art bed rail may include a strap and a counter member, such as for the embodiment shown in FIG. 3A. Another kit for modifying a prior art bed rail may include a pair of straps and a pair of counter members, such as for the embodiment shown in FIG. 3B. These kits may or may not include piece 84.

FIG. 4D shows a detail view of piece 84 that includes a slot 90 for receiving leg portion 44, aperture 92 for receiving pin 86, and strap receiving slot 88.

Figure 4E:
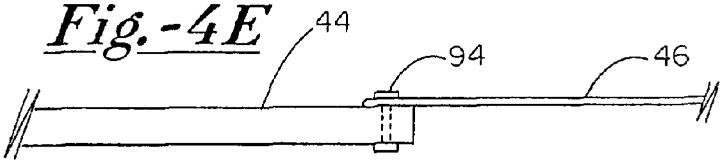
FIG. 4E is a diagrammatic view of another embodiment of a distal end for the bed rail of FIG. 4A.

FIG. 4E shows that strap 46 may be engaged directly to leg portion 44 with a pin 94 such as a rivet.

Figure 5A:
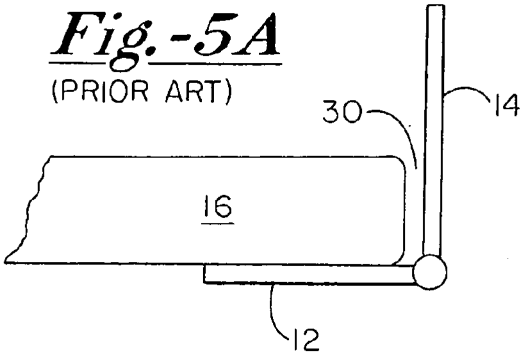
Fig.-5A (PRIOR ART)
FIG. 5A is an end diagrammatic view showing a prior art bed fail and shows how the prior art bed rail may form a gap between the rail portion and the mattress.

FIG. 5A shows in detail gap 30 between rail portion 14 and mattress 16.

Figure 5B:
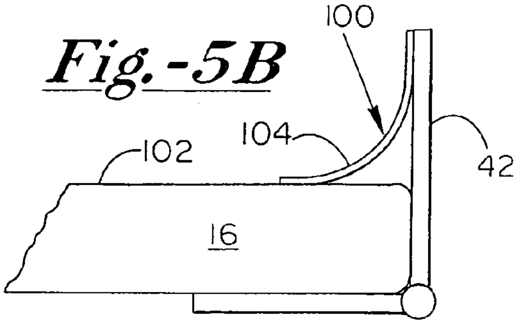
FIG. 5B is an end diagrammatic view of another embodiment of the present invention where such embodiment includes a cover for closing off any gap that may be formed between the rail portion and the mattress of FIG. 5A.

FIG. 5B shows another embodiment of the present invention where a cover apparatus 100 is disposed between a rail portion, such as rail portion 42, and a sleeping surface 102 of mattress 16. Cover apparatus 100 includes a cover 104 depending from an uppermost portion of bed rail 42, such as an upper horizontally extending portion of frame 32 and being shaped, such as with living hinges, so as to extend downwardly and inwardly to lie on top of sleeping surface 102 to close off any gap 30 that may happen to come into existence.

Figure 5C:
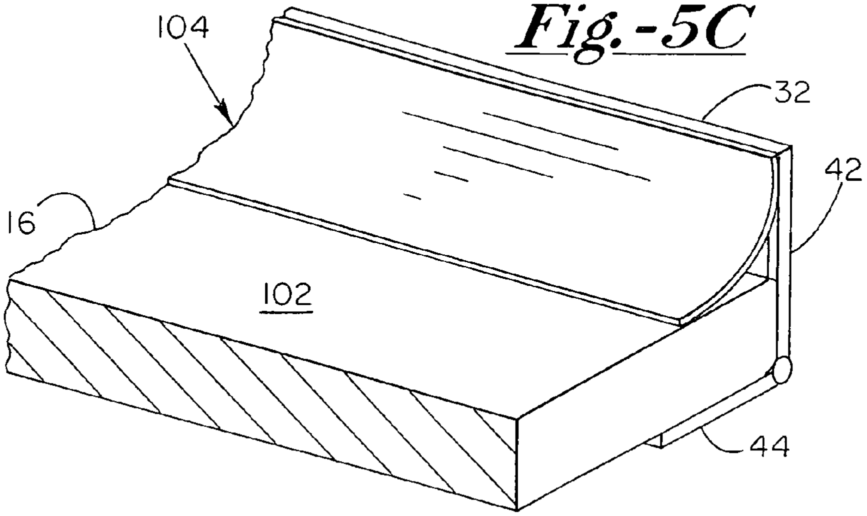
FIG. 5C is a perspective diagrammatic view of the cover of FIG. 5B where the cover is engaged to and depends from an uppermost portion of the rail portion of the bed rail.

FIG. 5C shows a perspective view of the cover apparatus 100 of FIG. 5B where the cover 104 depends from an uppermost portion of rail portion 42. A Velcro® connection or similar hook and loop connection may provide for connection between the frame 32, the lock arm 120 and the cover 104 as well as the sleeping surface 102.

Figure 5D:
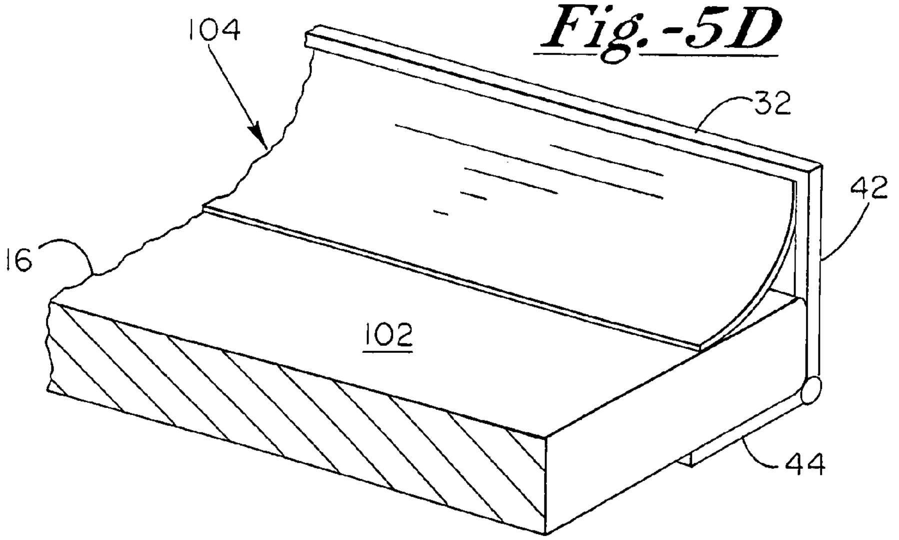
FIG. 5D is a perspective diagrammatic view of the cover of FIG. 5B where the cover is engaged to and depends from a section below the uppermost portion of the rail portion of the bed rail.

FIG. 5D shows that the cover 104 can depend from a position below the uppermost portion of rail portion 42.

Figure 6A:
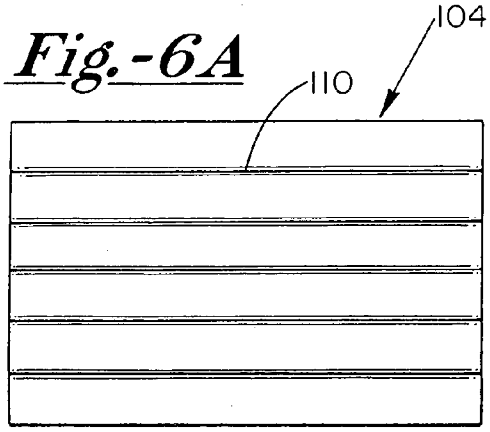
FIG. 6A is a diagrammatic top view of the cover of FIG. 5B showing how the semi-rigid cover has living hinges or relatively weak sections or relatively less rigid sections extending lengthwise across the cover.

FIG. 6A shows that the cover 104 may have living hinges 110. The living hinges 110 are weakened portions of the cover 104 that is preferably formed of a semi-rigid plastic material. The rigid characteristics of cover 104 keep the cover 104 in place even with the weight of a person on the cover 104 and even with the weight of the person being directed on a line running between rail portion 42 and leg portion 44. The flexible characteristics of cover 104 permit a bend to the cover 104 to permit a somewhat comfortable shape to the cover 104. The living hinges 110 provide the curved shape to the cover 104 and further permit the cover 104 to be folded into a compact shape for storage. The living hinges 110 run the length of the cover 104 so as to run in the same direction as the length of the rail portion 42. The cover 104 may be formed of PVC or of a low density plastic. The living hinges may be formed by perforations in the cover 104. If desired, the cover 104 may be formed of a cloth or when the cover 104 is of a sheet material other than cloth, the cover 104 may be sheathed in cloth for comfort against the skin.

Whether the cover 104 is rigid or whether the cover 104 is made of a flexible or cloth or sheet material, the cover 104 may include, such as on its underside, a material that has a high amount of friction with bedding or a mattress or a mattress covering so as to minimize the chances of the covering 104 falling into any gap 30 that may be created. The material having a high amount of friction may be provided by a material such as neoprene, silicone, rubber, or a rubber-based material where such material is nontoxic.

Figure 6B:
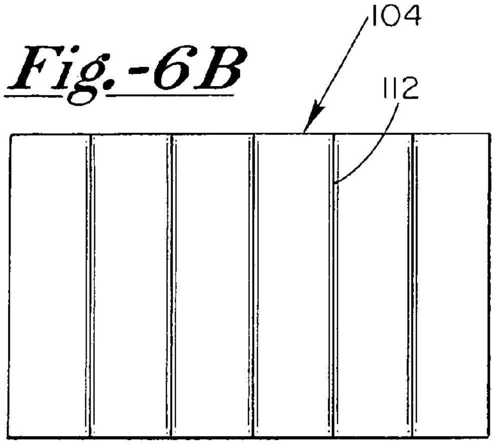
FIG. 6B is a diagrammatic top view of the cover of FIG. 5B showing how the semi-rigid cover has living hinges or relatively weak sections or relatively less rigid sections extending across the width of the cover so as to extend in the direction of the leg portion of the bed rail.

FIG. 6B shows that living hinges 112 running in the direction of the leg portions 44. Here the living hinges 112 permit a folding of the cover 104 into a compact shape for storage but do not contribute toward providing the curved comfortable shape shown in FIGS. 5B, 5C and 5D.

Figure 6C:
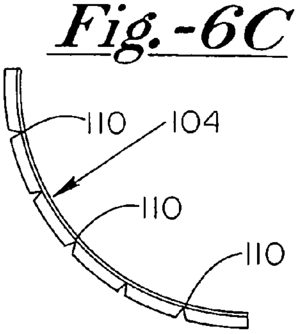
FIG. 6C is a detail end view of the cover of FIG. 5B showing the living hinges.

FIG. 6C shows a detail view of the living hinges 110.

Figure 6D:
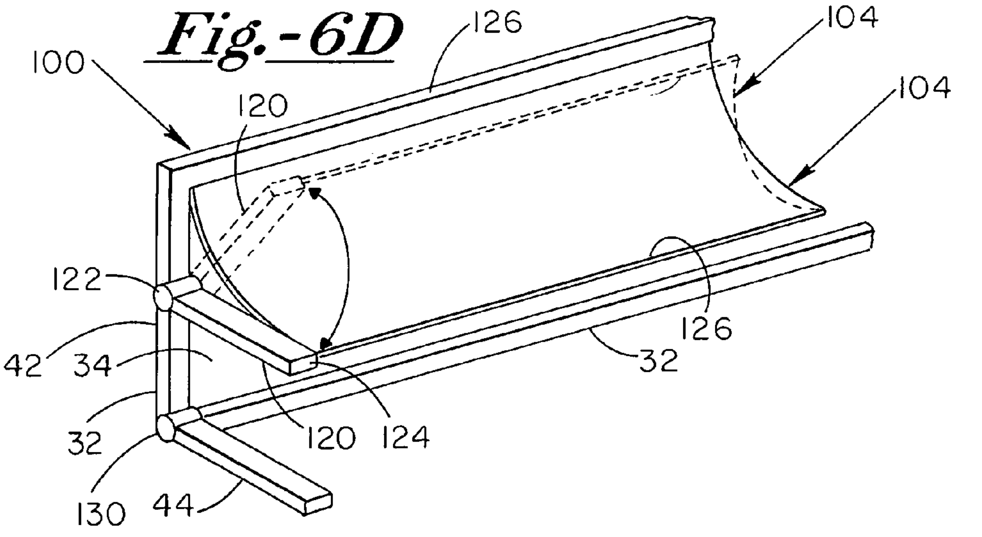
FIG. 6D is a diagrammatic perspective view of the cover of FIG. 5B having a pivoting arm lock that is raised and lowered to raise and lower the cover.

FIG. 6D shows a pivot lock arm 120 for the cover apparatus 100. The pivot lock arm 120 includes a pivot 122 joined to frame 32 of rail portion 42. The pivot lock arm 120 includes a distal end portion 124 that is joined to a distal edge portion 126 of cover 104. Pivot 122 includes a lock such that a downward operating position (shown in solid lines in FIG. 6D) of cover 104 may be locked in place on top of sleeping surface 102. The lock may also be operational when the pivot lock arm 120 is in an upward open position (shown in phantom in FIG. 6D). Also shown in FIG. 6D is a pivot structure 130 that may be provided between rail portion 42 and leg portion 44 to permit the bed rail 40 to be folded for storage. The lock arm 120 may pivot for about 180 degrees from a position on sleeping surface 102 to a position on the other side of the rail portion 42.

Figure 7A:
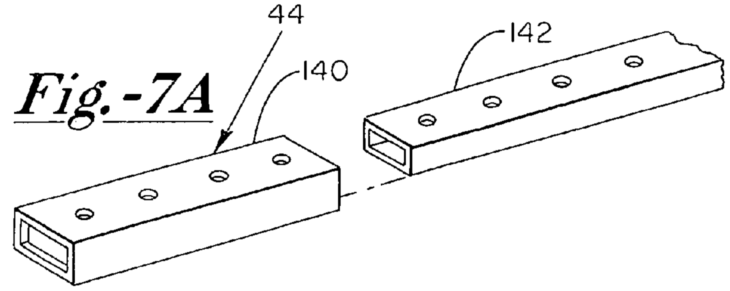
FIG. 7A is a perspective diagrammatic view of one embodiment of the leg portion for the bed rail of the present invention, where the leg portion includes squared off telescoping portions between the rail portion and the counter member to draw the rail portion and counter member to and from each other.

FIG. 7A shows another embodiment of the invention, where leg portion 44 may include telescoping members 140 and 142 to draw the counter member and the rail portion 44 to and away from each other. Telescoping members 140 and 142 are squared off to prevent the members 140, 142 from spinning relative to each other.

Figure 7B:
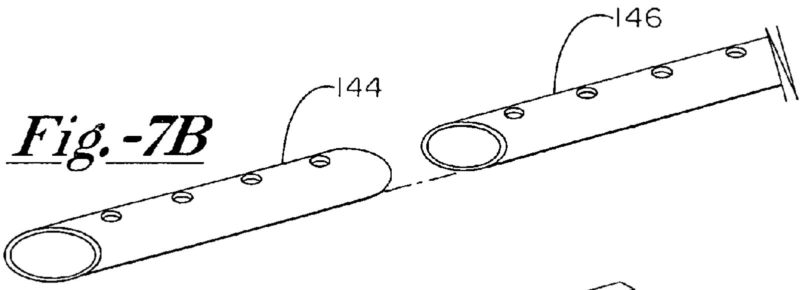
FIG. 7B is a perspective diagrammatic view of another embodiment of the leg portion for the bed rail of the present invention, where the leg portion includes rounded telescoping portions between the rail portion and the counter member to draw the rail portion and counter member to and from each other.

FIG. 7B shows telescoping members 144 and 146 that are oval or elliptical in section so as to provide a round shape but yet prevent the members 144 and 146 from spinning relative to each other.

Figure 7C:
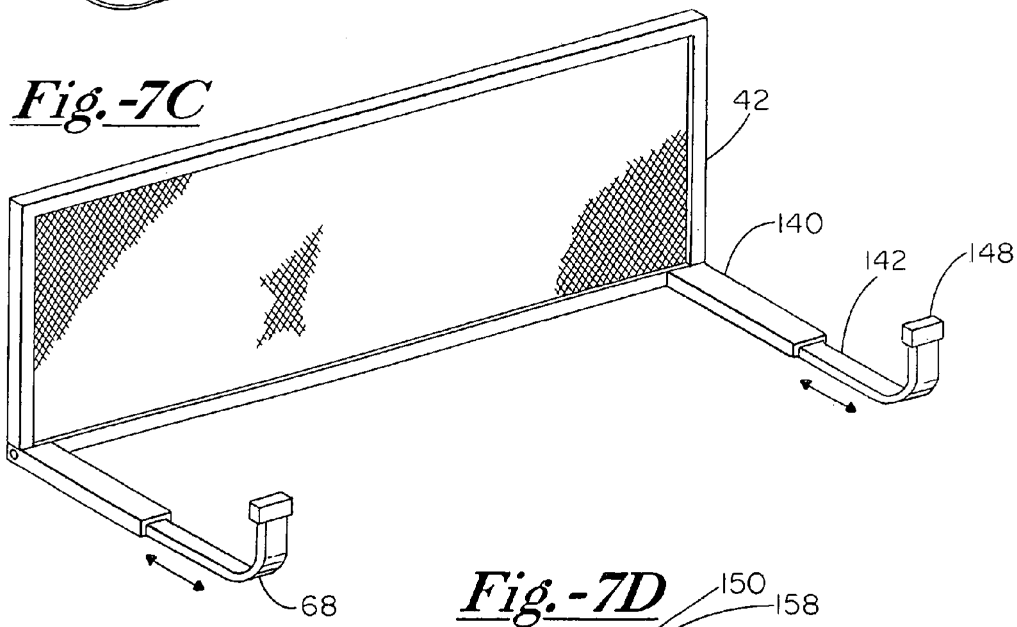
FIG. 7C is a perspective diagrammatic view of the hugging bed rail of the present invention having one of the telescoping members of FIGS. 7A and 7B and further shows how the counter members may be turned upwardly to engage the mattress instead of the box spring.

FIG. 7C shows that one telescoping member 140 (or 144) may be pivotally joined to rail portion 42 and that another telescoping member 142 (or 146) may include counter member 68. Counter member 68 may include cap 148.

Figure 7D:
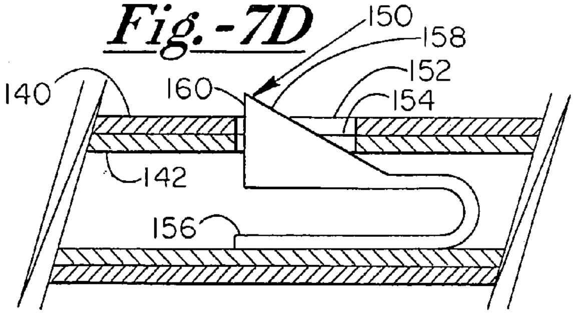
FIG. 7D is a perspective diagrammatic view of a button feature of the telescoping leg portions of FIGS. 7A, 7B and 7C, where the button feature permits automatic sliding of the telescoping members relative to each other so as to draw the counter members and rail portion towards each other, and where the button feature permits sliding of telescoping members relative to each other so as to draw the counter members and rail portion apart only upon positive pressure upon the button.

FIG. 7D shows a button 150 extending though a hole 152 formed in member 140 and a hole 154 formed in member 142. Button 150 includes a base 156 affixed to an inner surface of member 142 and further includes an inclined surface 158 and an upright or confronting surface 160 confronting surfaces of the members 140, 142 that form the holes 152, 154. The provision of the inclined surface 158 on button 150 permits the counter member 68 and rail portion 42 to be drawn towards each other automatically or with little effort. Accordingly, it is relatively easy to make the rail portion 42 fit tightly against the first side 26 of the mattress 16. The provision of the confronting surface 160 on button 150 permits the counter member 68 to be drawn apart from the rail portion 42 only with the difficulty associated with depressing button 150. Accordingly, it is relatively difficult to loosen the bed rail 40 and therefore the chances of forming a gap 30 are minimized.

Figure 8:
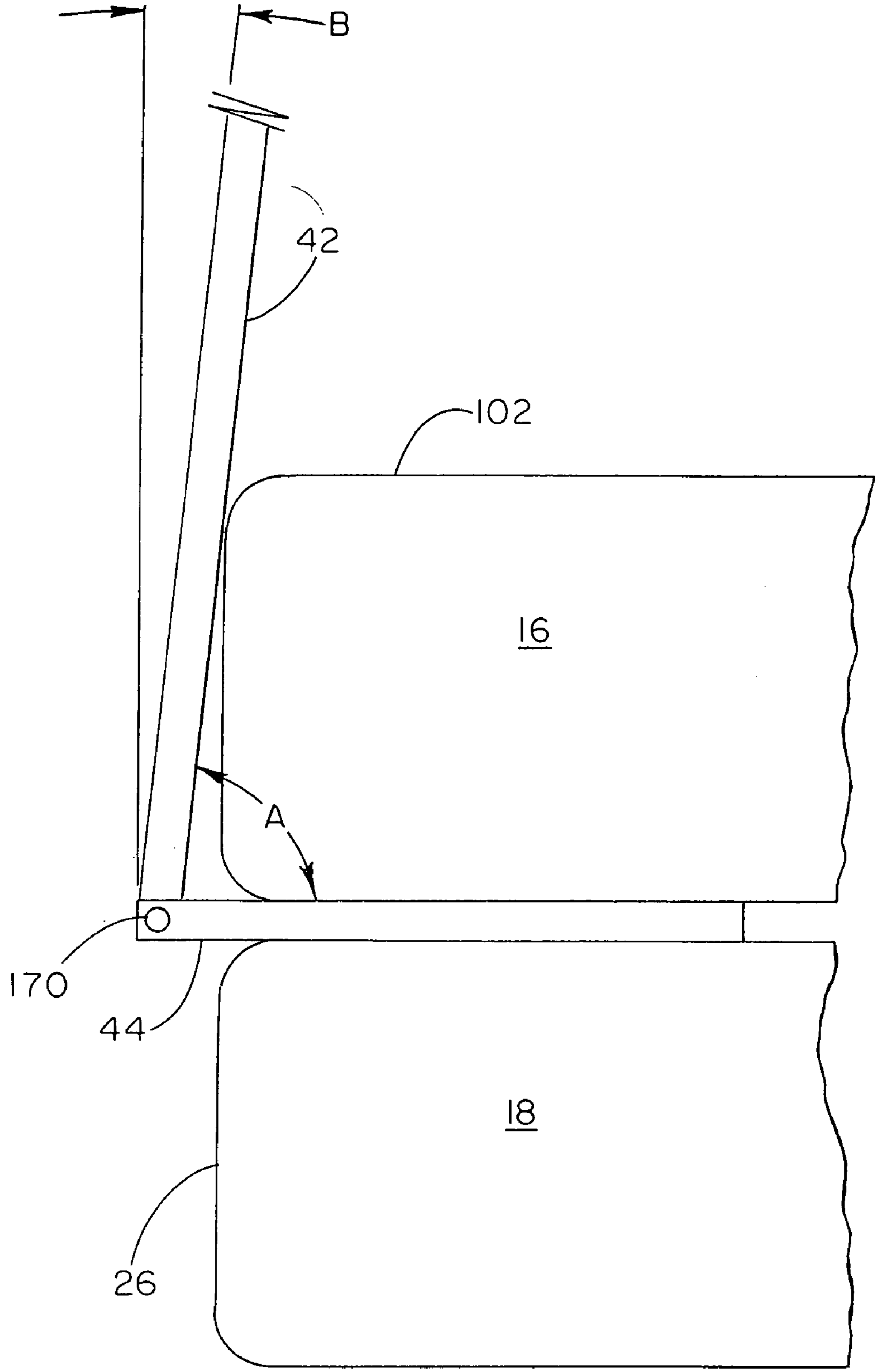
FIG. 8 is a diagrammatic end view of still another embodiment of the present invention where the rail portion of the bed rail is locked at an acute angle relative to the leg portion of the bed rail such that the leg portion of the bed rail does not run parallel to the first side of the mattress.

FIG. 8 shows that rail portion 42 (or the plane in which the frame 32 of the rail portion 42 lies) is preferably set at an acute angle A relative to leg portion 44 (or at an acute angle to the plane in which the leg portions 44 lie). A pivot mechanism 170 may permit a swinging between the rail portion 42 and, in such a case, such pivot mechanism 170 does not permit a swinging to a right angle arrangement or to a swinging to an obtuse angle arrangement. Preferably, the angle between rail portion 42 and leg portion 44 is between 70 and 89 degrees, more preferably between 70 and 88 degrees, even more preferably between 70 and 87 degrees, yet more preferably between 70 and 86 degrees, and most more preferably between 70 and 85 degrees. The provision of an acute angle between the rail portion 42 and leg portion 44 works to close off any gap 30 and sets the rail portion 42 as close to the sleeping surface 102 as possible. FIG. 8 shows the most preferred angle B of five degrees (where angle A is 85 degrees) where angle B defines the relationship between rail portion 42 and a plane parallel to the first side 26 of mattress 16. The button 150 and its cooperating apertures may be referred to as a one directional quick connect.

As to rail portion 42, as to leg portion 44, as to frame 32, as to wall 34, as to how rail portion 42 and leg portion 44 are swingable to each other and as to how rail portion 42 and leg portion 44 may be foldable or collapsible to a stored position, the Wu U.S. Pat. No. 5,671,490 issued Sep. 30, 1997 is hereby incorporated by reference in its entirety.

It should be noted that the present bed rail 40 may be engaged to only a mattress or to only a mattress and a frame. The frame may or may not have slats. It should be noted that leg 44 may be broad or paddle-shaped so as to rest upon slats instead of falling through the slats. Slats may be used where no box spring is used.

Figure 9:
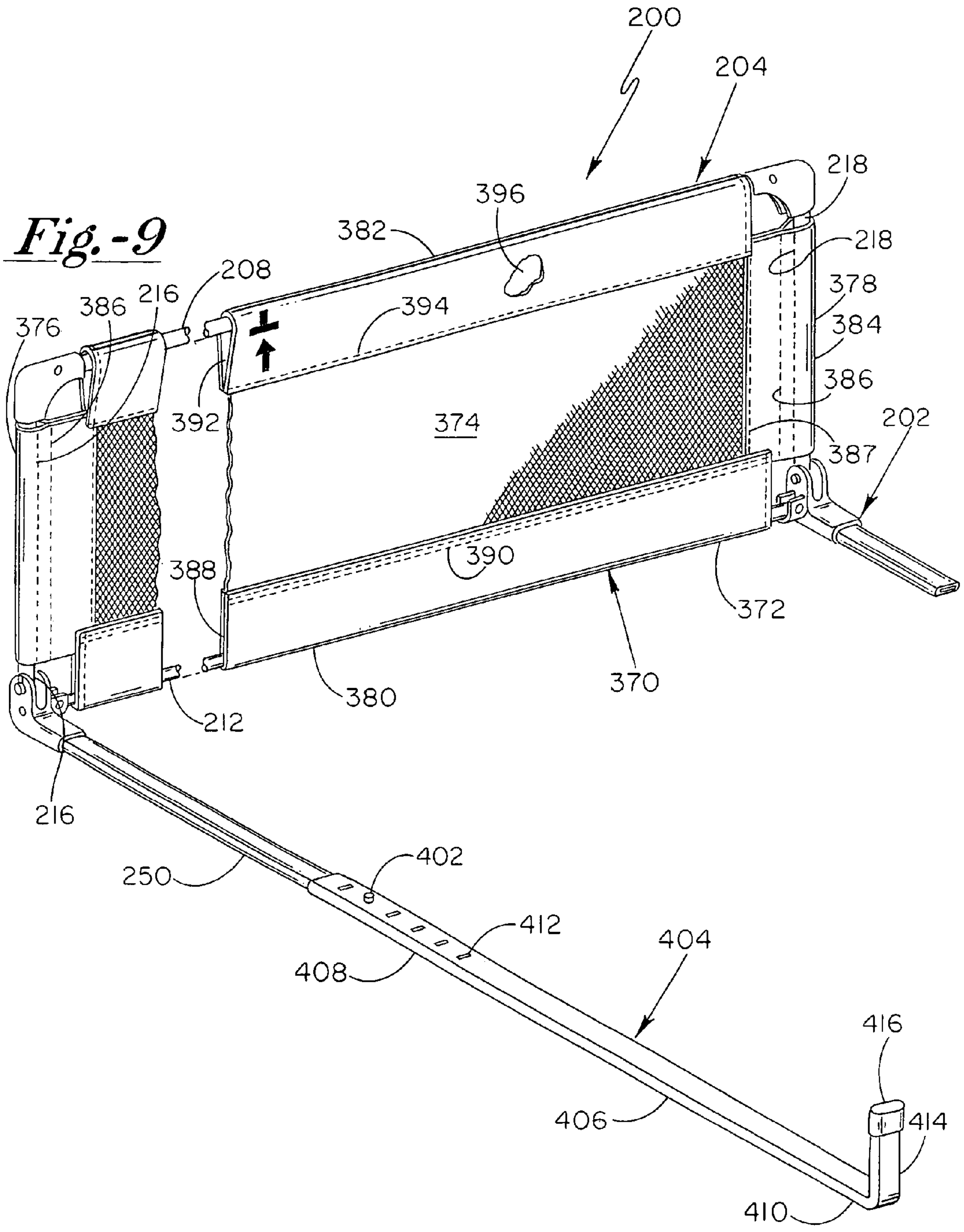
FIG. 9 is a perspective view of a preferred embodiment of the bed rail of the present invention wherein the leg of the bed rail includes a first embodiment of a counter attachment.

FIG. 9 shows a bed rail 200. Bed rail 200 generally includes a leg portion 202 and a rail portion 204.

Figure 10:
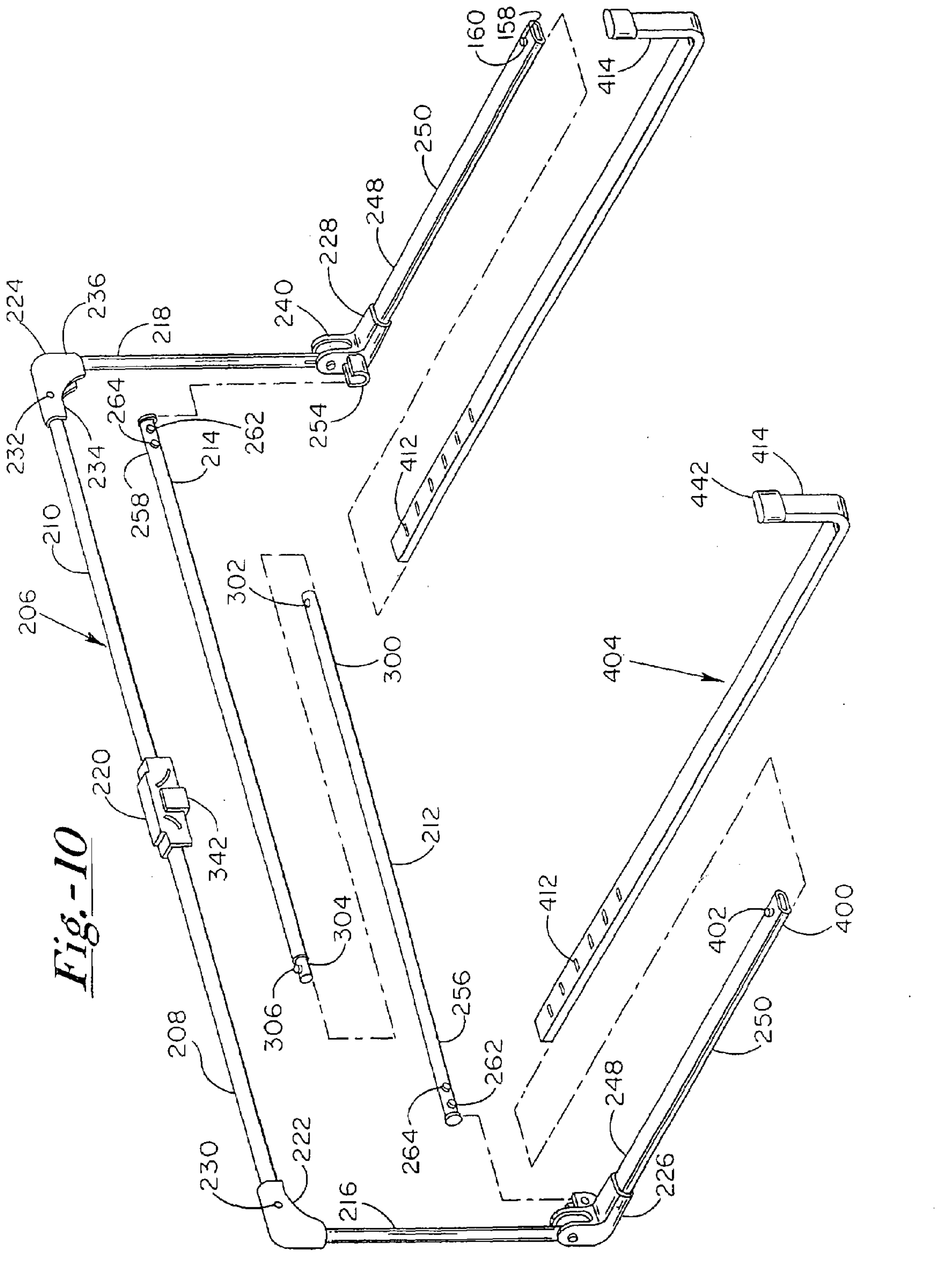
FIG. 10 is a broken apart view of the frame of the bed rail of FIG. 9.

As shown in FIG. 10, rail portion 204 includes a frame assembly 206. Frame assembly 206 includes upper rails or tubes 208, 210, lower rails or tubes 212 and 214, and side rails or tubes 216 and 218. Upper rails 208 and 210 are interconnected via a hinge mechanism 220. Frame assembly 206 further includes respective first and second upper corner two point connections 222, 224 and first and second lower corner three point connections 226, 228.

Distal ends or distal end portions of upper tubes 208, 210 are pivotally affixed via respective pins 230, 232 to upper corner connections 222, 224 such that tubes 208, 210 swing relative to tubes 216, 218. Such relative swinging of tubes 208, 210, 216 and 218 occurs in generally the same plane.

An inner portion 234 of each of the corner connections 222, 224 are U-shaped in cross section to permit the tubes 208 and 210 to swing relative to corner connections 222, 224 and toward tubes 216 and 218.

Upper ends or upper end portions of side tubes 216, 218 are rigidly affixed, with no pivotal swinging and no axial sliding, in a cylindrical receptacle formed in an outer portion 236 of each of the corner connections 222, 224. The cylindrical receptacle is a non-through hole. Each of the upper end portions of the side tubes 216, 218 are fixed in their respective cylindrical receptacles with a pin. Such a pin is preferably a spring biased button which, upon being pushed into its respective side tube 216, 218, permits the respective side tube 216, 218 to be withdrawn out of the cylindrical receptacle for disassembly and then snapped back in for reassembly. Such is preferable because this allows the sheet wall 370 to be easily taken off and placed back on the frame assembly 206.

Each of the lower corner connections 226, 228 is a three point connection and includes a molded body 240 that is integral and one-piece. Body 240 includes a pair of opposing, spaced apart sidewalls 242, 244 where sidewall 242 is an outer sidewall and where sidewall 244 is an inner sidewall. Sidewalls 242, 244 lead integrally into a female receptor 246 for a distal end or distal end portion 248 of base leg sections 250 of the leg portion 202 of the bed rail 200. Female receptor 246 is oblong in section to minimize an axial spinning of base leg sections 250 relative to the lower connections 226, 228 and thus to minimize an axial spinning of the base leg sections 250 relative to the rail portion 204. Base leg section 250 is rigidly fixed in receptor 246 and to body 240 via a pin 252. It should be noted that molded body 240 is preferably reinforced with a steel bracket having steel plate portions 253 engaged on the inner sides of sidewalls 242, 244. Steel plate portions 253 are interconnected via an integral bracket 255.

Body 240 further includes a cradle 254 for engaging the distal ends or distal end portions 256, 258 of lower tubes 212, 214. Cradle 254 is one-piece and integral with body 240 such that cradle 254 is one-piece and integral with female receptor 246. Cradle 254 is a semi-circular open end receptor having a pair of aligned through holes 260. Holes 260 engage opposing ends of an outer two ended button 262 which is found on distal end portion 256 of lower tube 212 and which is further found on distal end portion 258 of lower tube 214. Each of the ends of button 262 extends, in the biased and locked position, beyond the outer diametrical surface of its respective tube 212, 214 such that each of the ends of button 262 can engage holes 260. Each of the ends of button 262 is resiliently depressable or pushable radially into tube 212 or 214 such that the absolute end of button 262 is at or within the outer diametrical surface of tube 212, 214 such that the button 262 can disengage from holes 260. Outer two ended buttons 262 may be operated directly such as by sliding a fingernail between cradle 254 and the end of the button 262. More preferably, each of the outer two ended buttons 262 is operated by a respective inner two ended button 264 that is not engaged by cradle 254 and that lies at an accessible location outside of cradle 254 when tubes 212, 214 are engaged by cradles 254. Each of the ends of buttons 262, 264 extends through openings formed in tubes 212, 214. The structural arrangement for buttons 262, 264 includes a C-shaped flat spring pinched resiliently within each of the distal end portions 256, 258 of tubes 212, 214. Each of the ends of the C-spring includes one end of button 262 and one end of button 264 such that a pushing upon one end of inner button 264 draws the respective, same sided outer button 262 inwardly. Hence a pinching of the ends of inner button 264 radially inwardly also draws the outer ends of button 262 radially inwardly.

Figure 15A:
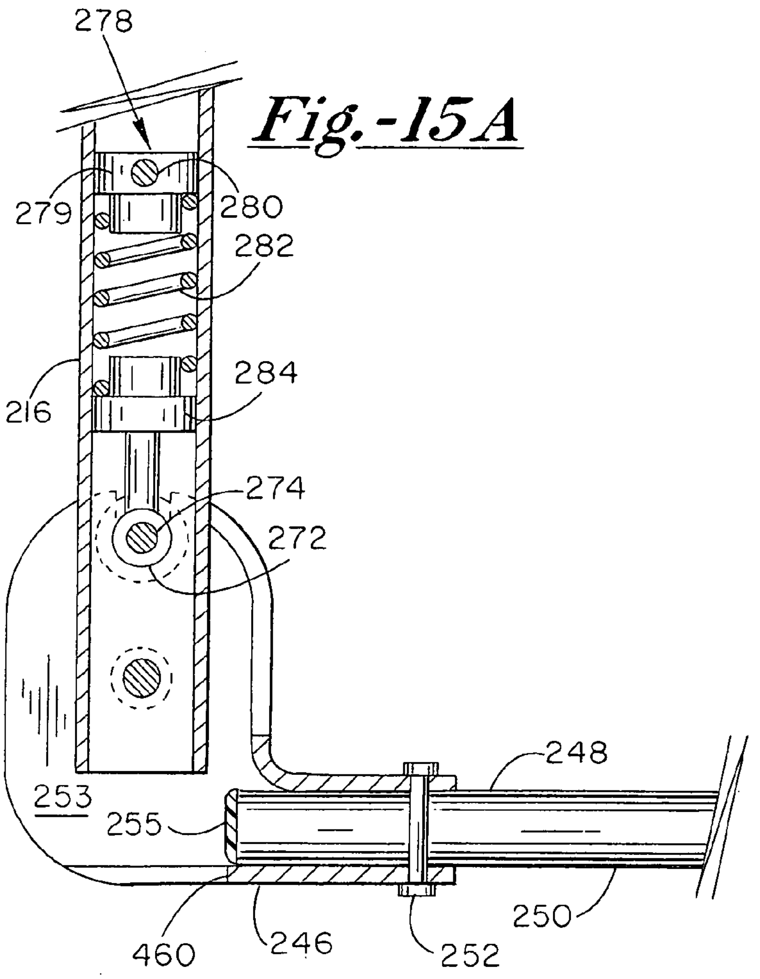
FIG. 15A is a section view of the corner of the frame of FIG. 14A and shows the leg of the bed rail in an operating, folded out position.
Figure 15B:
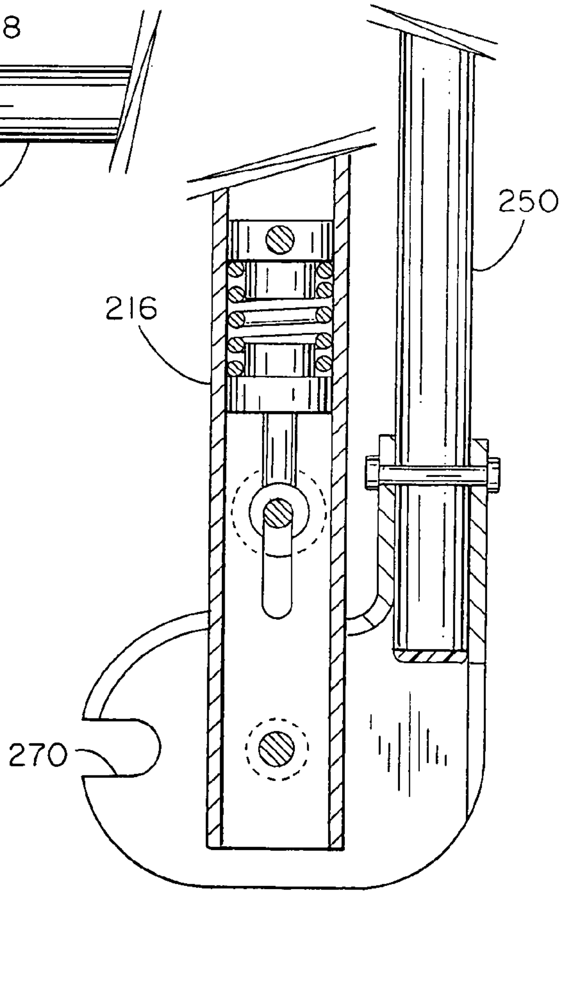
FIG. 15B is a section view of the corner of the frame of FIG. 14C and shows the leg of the bed rail in a folded position for storage.

Each of the sidewalls 242, 244 includes an upper open ended slot or detent 270 for receiving a roller 272 rotatably engaged on a pin 274. Pin 274 in turn is affixed to, and extends at a right angle to, a spring biased plunger 276 engaged within each of the side tubes 216, 218. As shown in FIGS. 15A and 15B, a first end or base 279 of plunger 278 is rigidly fixed to its side tube 216, 218 with a pin 280. A coil spring 282 extends from base 279 to a piece 284 having a portion set within the coil spring 282 and having a disk portion slidingly engaging the inner diametrical surface of tube 216 or 218. Piece 284 leads into a projection 286 which has a through hole formed therein for pin 274. Piece 284 and projection 286 may be molded as one part so as to be one-piece and integral. A pair of slots 288 are formed in each of the tubes 216, 218. Slots 288 of tube 216 are aligned with each other and slots 288 of tube 218 are aligned with each other such that pin 274 can travel the length of slots 288 and in the axial direction of tubes 216, 218.

Figure 14A:
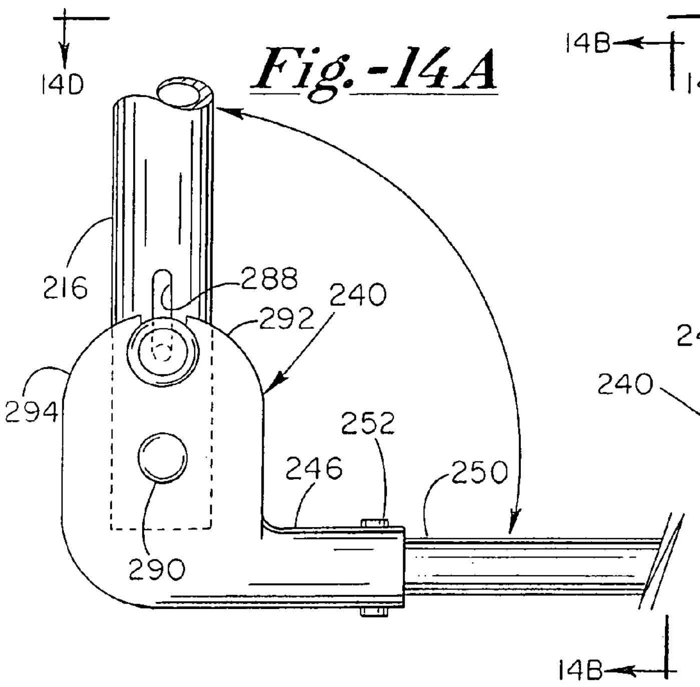
FIG. 14A is a side view showing a corner of the frame of the bed rail of FIG. 9 and shows the leg of the bed rail in an operating, folded out position.
Figure 14B:
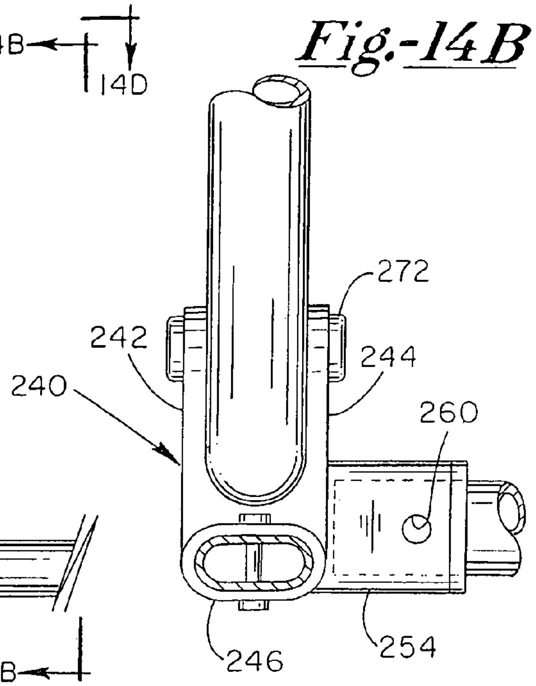
FIG. 14B is a view at lines 14B-14B of FIG. 14A.
Figure 14C:
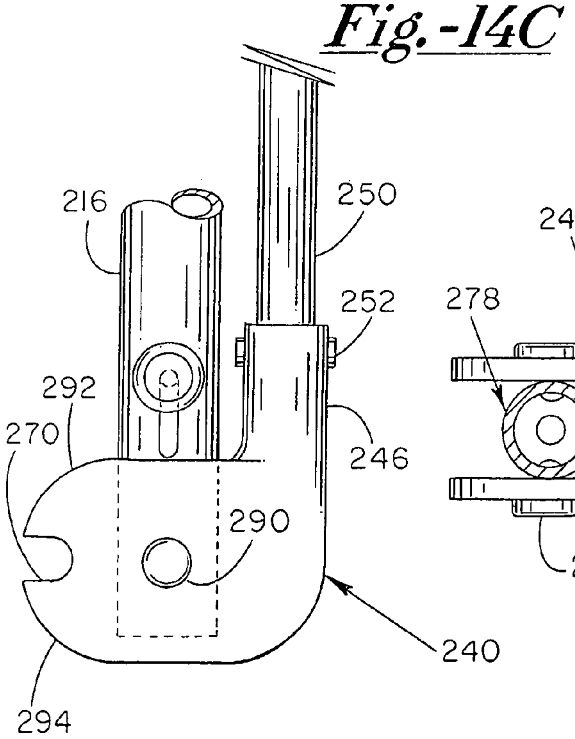
FIG. 14C is a side view of the corner of the frame of FIG. 14A and shows the leg of the bed rail in a folded position for storage.
Figure 14D:
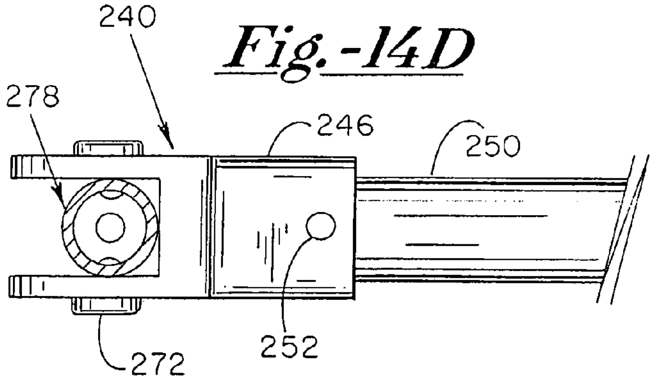
FIG. 14D is a view at lines 14D-14D of FIG. 14A.
Figure 18:
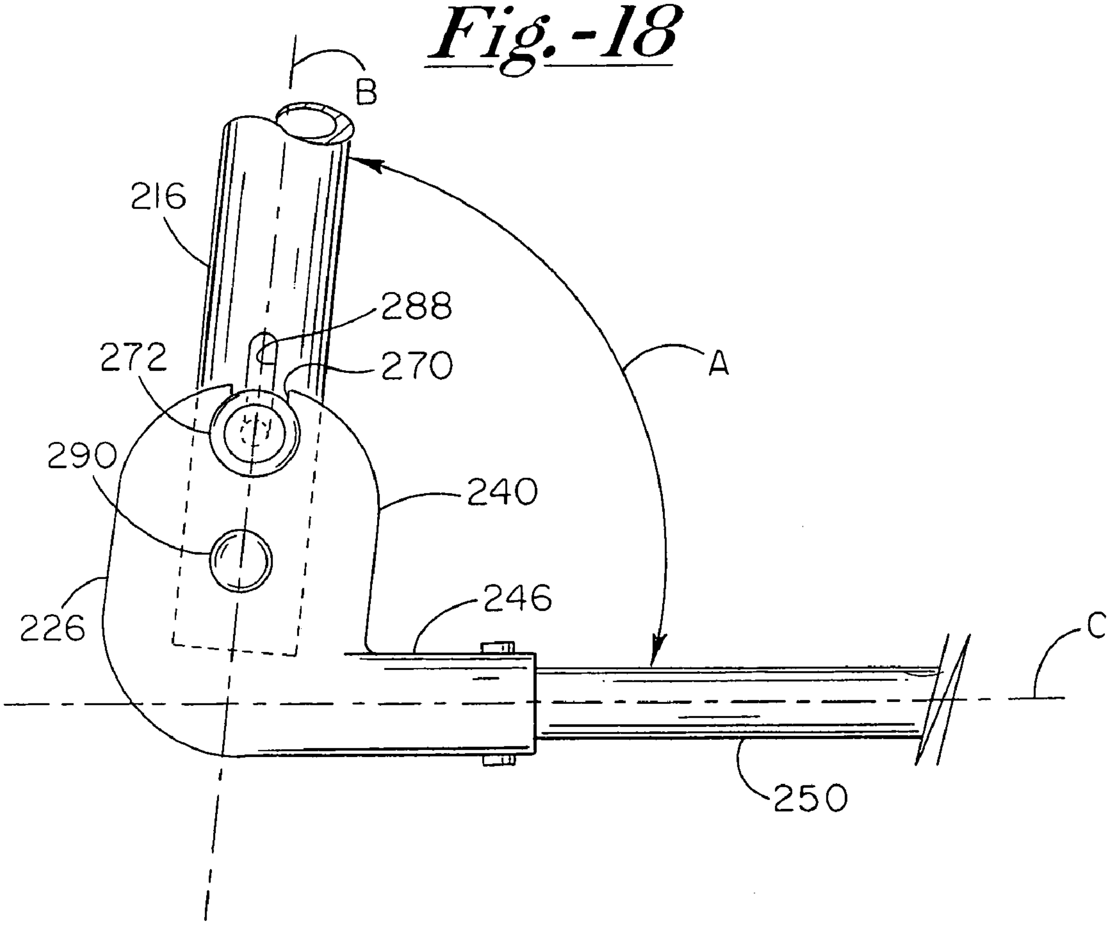
FIG. 18 shows the preferred embodiment for a lower corner or lower connection of the bed rail of FIG. 9 so as to position the rail portion of the bed rail at an acute angle relative to the leg portion of the bed rail.
Figure 19:
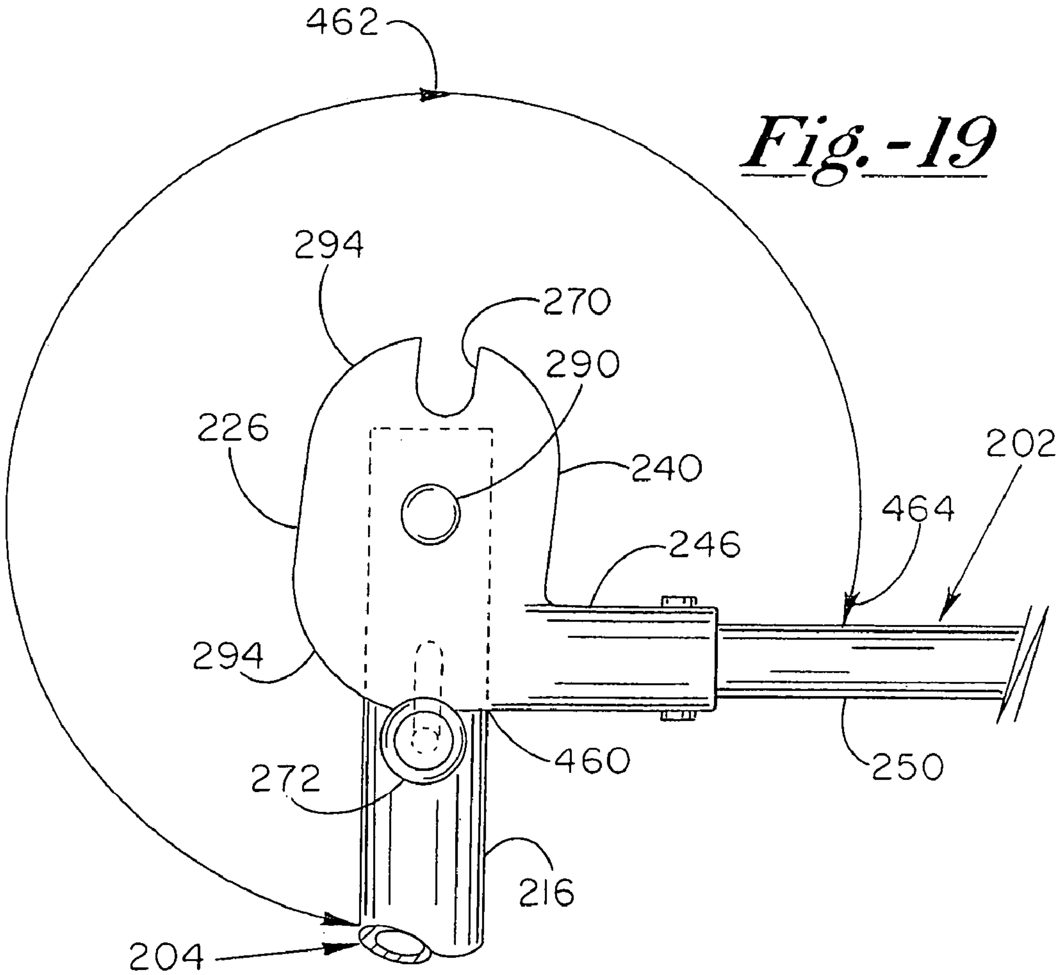
FIG. 19 shows the preferred lower connection of FIG. 18 and shows how the rail portion 204 may be swung downwardly relative to the leg portion 202 when use of the rail portion 204 is not desired.

Body 240 is pivotally fixed to side tubes 216, 218 via a pin 290 engaged to each of the sidewalls 242, 244. Body 240 is fixed or locked in position to side tubes 216, 218 by the rollers 272 being engaged in the detents 270. In the locked position, the plunger 278 is biased to its extended position by the coil spring 282 and keeps the rollers 272 locked into the detents 270. To unlock the side tubes 216, 218 from the lower corner connections 226, 228 and hence to unlock rail portion 204 from the leg portion 202, the rollers 272 are drawn by hand axially toward a central portion of tubes 216, 218 to draw the rollers 272 out of the detents 270. When the rollers 272 are disengaged from the detents 270, the side tubes 216, 218 are relatively swingable relative to the leg portions 202. This relative swinging permits: 1) the rail portion 204 to be swung downwardly to a right angle relative to the leg portion 202 to confront side 26 of box spring 18 so that one can have relatively easy access to get in and out of the bed 24, as shown in FIG. 19; 2) the rail portion 204 to be swung upwardly to an upright position and right angle position relative to the leg portion 202, whereupon the rollers 272 snap into the detents 270 under the plunger bias, as shown in FIG. 18; 3) the side tubes 216, 218 to be swingable relative to the legs 250 such that the legs 250 can be drawn upward relative to the side tubes 216, 218 for storage, as shown in FIG. 14C; and 4) the side tubes 216, 218 to be swingable relative to the legs 250 such that the legs 250 and side tubes 216, 218 can be unfolded from a stored compact arrangement and locked into an operating position.

Sidewalls 242, 244 of body 240 have a partially curved and partially linear perimeter 292 upon which the rollers 272 roll when the bed rail 200 is being folded into or from a stored, compact arrangement. Sidewalls 242, 244 have a partially curved and partially linear perimeter 294 upon which the rollers 272 roll when the rail portion 204 is being dropped against the side 26 of the box spring 18 or when the rail portion 204 is being swung up from side 26 of box spring 18 to an upright operating position against the side 26 of the mattress 16. FIG. 19 shows the downwardly swung position of the rail portion 204.

Lower tubes 212 and 214 engage each other with a male/female connection. Lower tube 212 includes an inner female end portion 300 having a hole or button receptor 302. Lower tube 214 includes an inner male end portion 304 having a button 306 that is biased radially outwardly so as to snap into hole 302 and lock the tubes 214, 216 relative to each other such that the tubes 214, 216 cannot spin relative to each other and such that the tubes 214, 216 cannot slide in the axial direction relative to each other until the button 306 is pressed, whereupon the tubes 212, 214 can be disengaged from each other.

Lower tubes 212, 214, when fixed to each other and set in cradles 254, provide a rigid lower rail for the rail portion 204; side tubes 216, 218, when the rollers 272 are locked in the detents 270, provide rigid side rails for the rail portion 204; and upper tubes 208, 210, when the hinge mechanism 220 is locked, provide a rigid upper rail for the rail portion 204, whereby a relatively rigid frame assembly 206 is provided for rail portion 204.

As shown in FIGS. 16A, 16B, 17A and 17B, hinge mechanism 220 includes a housing 308 having a front wall 310 and a rear wall 312 that are interconnected with a semi-cylindrical top portion 314 such that housing 308 takes generally an inverted U-shape. Proximal end or proximal end portions 316, 318 of upper tubes 208, 210 are swingably affixed to housing 308 via pins 320, 322 engaged between front wall 310 and rear wall 312. Disposed inwardly from the pins 320, 322 are pins 324, 326 running parallel to pins 320, 322. Pins 324, 326 are mounted in proximal end portions 316, 318 and extend at a right angle from the tubes 208, 210 via slots 328, 330 in the proximal end portions 316, 318. Pins 324, 326 are biased in the inwardly direction toward a locked position (toward the inner axial end of each respective tube 208, 210) via a coil spring 332 mounted in each respective proximal end portion 316, 318. Coil spring 332 is fixed under tension between its respective pin 324, 326 and an end piece 334 fixed in its respective tube 208, 210. End portions of pins 324, 326 ride in respective tracks 336, 338 formed in the front wall 310 and rear wall 312 of housing 308. In other words, a track 336 in front wall 310 is aligned with a track 336 formed in the rear wall 312, and these tracks 336 engage outer end portions of pin 324. Further, a track 338 formed in front wall 310 is aligned with a track 338 formed in rear wall 312, and these tracks engaged outer end portions of pin 326. Each of the ends of pins 324, 326 has a roller 340 rotatably mounted thereon such that hinge mechanism 220 includes four rollers 340.

Hinge mechanism 220 includes an unlocking mechanism 342 that unlocks hinge mechanism 220 by bringing pressure to bear on the four rollers 340. Unlocking mechanism 342 is a generally U-shaped piece having a front wall 344 confronting and sliding upon front wall 310 of housing 308 and further having a rear wall 346 confronting and sliding upon rear wall 312 of housing 308. A bottom portion 347 interconnects the front wall 344 and rear wall 346. Bottom portion 347 of unlocking mechanism 342 opposes top portion 314 of housing 308 of hinge mechanism 220 to provide squeezing surfaces when unlocking mechanism 342 and housing 308 are drawn relatively together. A pin 348 extends between front and rear walls 344, 346 and rides in slots 350 formed in each of the front wall 310, 312 of housing 308. Pin 348 and hence the unlocking mechanism 342 as a whole is biased toward a locked position by a coil spring 352 fixed under tension between pin 348 and an end piece 354 fixed to top 314 of housing 308 via pin 356. Unlocking mechanism 342 further includes guide pins 358 rotatably engaged in holes formed in the front wall 344 and rear wall 346 of unlocking mechanism 342 for engaging linear portions 360 of a periphery of front wall 344 and rear wall 346. Rollers 340 engage curved or tapering portions 362 of the front wall 344 and rear wall 346.

Each of the tracks 336, 338 of hinge mechanism 220 includes a curved or arc track portion 364 having as its center or pivot point pin 320 or 322. Pins 324, 326 ride in the arc track portion 364 when the rail portion 204 is being folded or unfolded. Each of the tracks 336, 338 further includes a linear track portion or detent 366 in communication with the arc track portion 364. Pins 324, 326 snap into the detent 366 when the rail portion 204 is folded to an operating position. Pins 324, 326 are forced out of the detent 366 and into the curved track portion 364 by the curved periphery portion 362 when the unlocking mechanism 342 is squeezed against the bias of the coil spring 352.

Figure 16A:
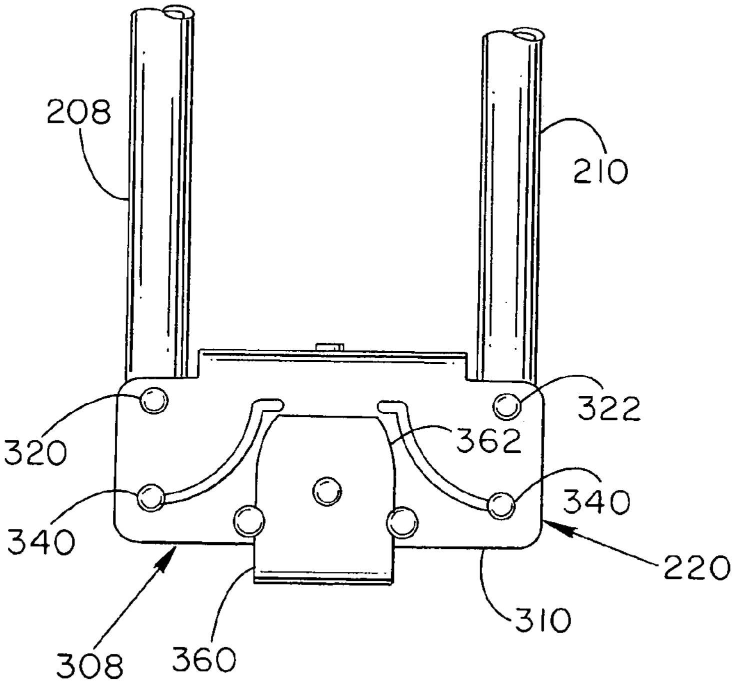
FIG. 16A is a side view of the hinge mechanism of the bed rail of FIG. 9 and shows top rails of the rail portion of the bed rail in the folded, stored position.
Figure 16B:
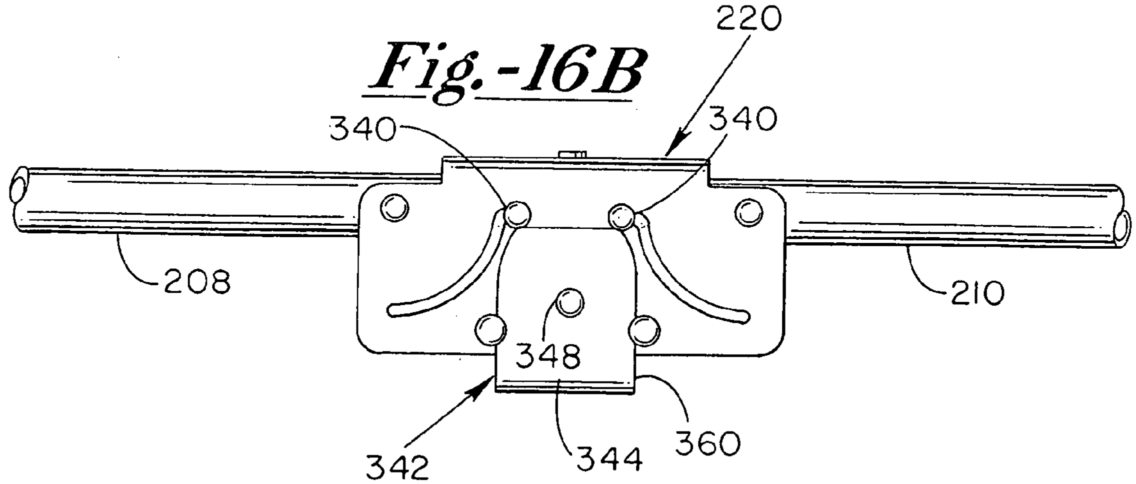
FIG. 16B is a side view of the hinge mechanism of the bed rail of FIG. 9 and shows the top rails of the rail portion of the bed rail in an operating position.
Figure 17A:
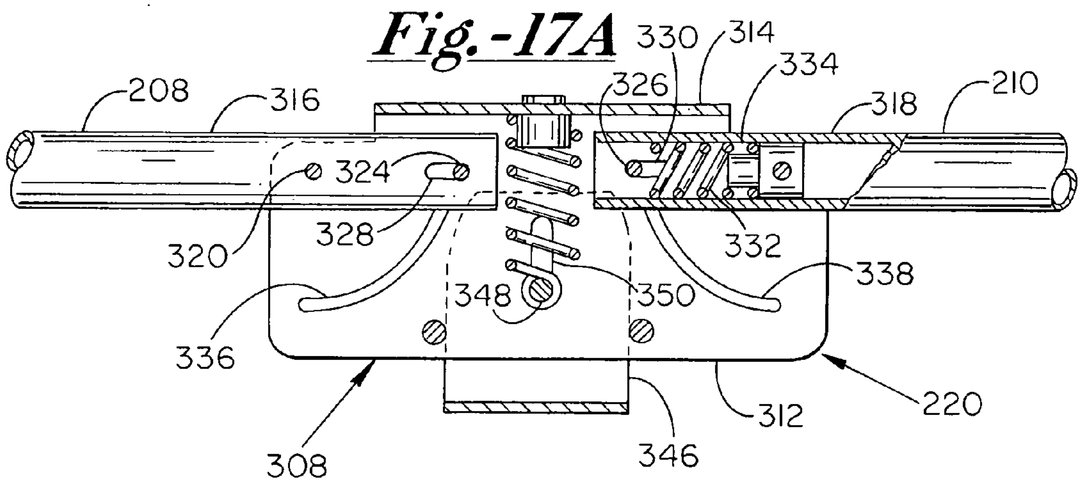
FIG. 17A is a section, partial view of the hinge mechanism of the bed rail of FIG. 9 and shows the top rails of the rail portion of the bed rail in an operating position.

FIGS. 16B and 17A show the hinge mechanism 220 in a locked position. Pins 324 and 326 are resiliently pressed into the detents 366 by the bias of the coil springs 332. Rollers 340 (on the ends of the pins 324, 326) confront the curved periphery portions 362 of the unlocking mechanism 342. Pin 348 of the unlocking mechanism 342 is resiliently brought to bear against the root base point of slot 350 by coil spring 352. In such locked position, upper tubes 208, 210 are locked in a straight line relative to each other.

Figure 17B:
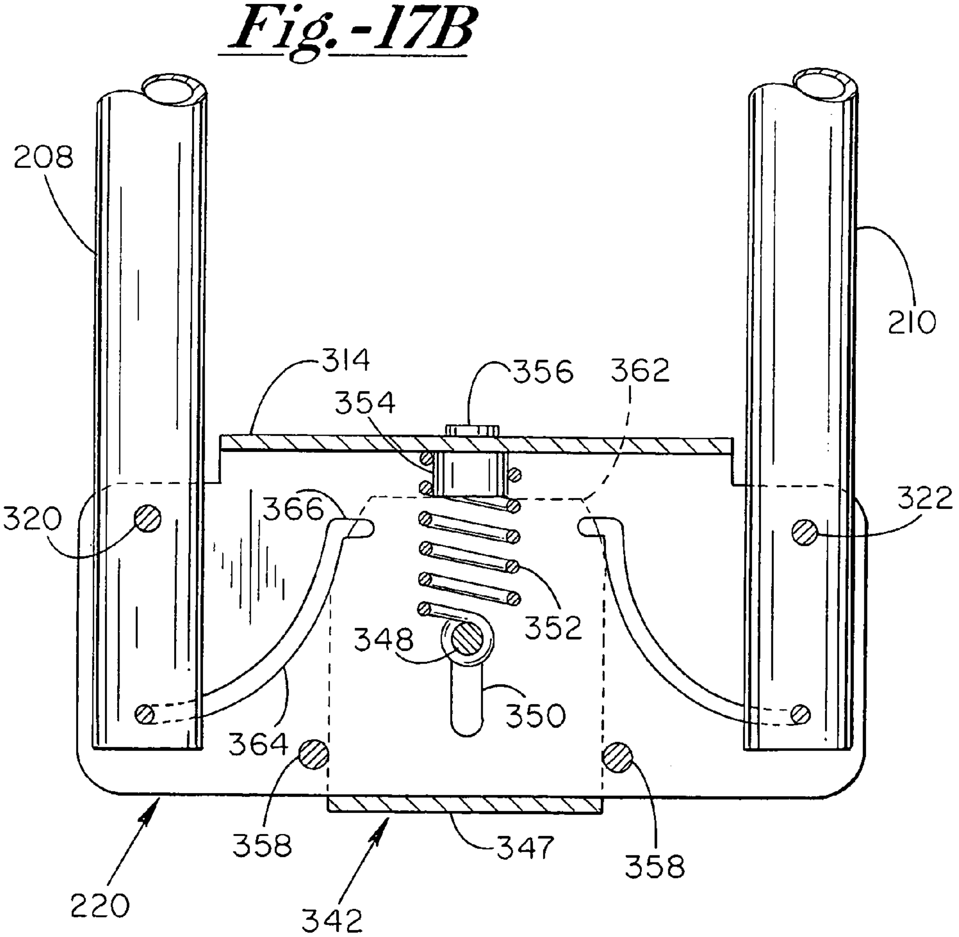
FIG. 17B is a section, partial view of the hinge mechanism of the bed rail of FIG. 9 and shows the top rails of the rail portion of the bed rail in a folded, stored position.

To unlock the hinge mechanism 220 so as to permit the upper tubes 208, 210 to swing relative to each other to a folded position where the upper tubes lie generally parallel to each other, unlocking mechanism 342 and housing 308 are squeezed relative to each other so as to draw the bottom portion 347 of the unlocking mechanism 342 toward the top portion 314 of housing 308. When the unlocking mechanism 342 is drawn upwardly, the curved periphery portions 362 are drawn against the rollers 340, which in turn pushes the pins 324, 326 against the bias of the coil springs 332 out of the detents 366 and into the curved track portions 364, thereby permitting each of the tubes 208, 210 to be swung on the pivot pins 320, 322. FIG. 17B shows the curved periphery portions 362 relative to the detents 366 when the unlocking mechanism 342 is fully squeezed. Upon a pivoting of tubes 208, 210 and upon a release of the unlocking mechanism 342, the unlocking mechanism 342 returns under the bias of the coil spring 352 to the position shown in FIG. 16A. The root base points of the arc track portions 364 act as a stop for pins 324, 326 and prevent a further swinging of the tubes 208, 210 beyond parallel relationship.

To lock the hinge mechanism 220 from the position shown in FIG. 16A, the tubes 208, 210 are swung on their pivots 320, 322 such that the pins 324, 326 ride in the curved track portions 364 toward the detents 366. Upon reaching the detents 366, the pins 324, 326 snap into the detents under the bias of the coil springs 332, whereupon the tubes 208 and 210 are locked relative to each other and whereupon the rollers 240 confront the curved periphery portions 362 for a subsequent unlocking operation.

As shown in FIG. 9, rail portion 204 further includes a fabric wall 370 engaged to the frame assembly 206. Fabric wall 370 generally includes a tubular periphery 372 and an interior, preferably nylon, mesh 374. Tubular periphery 372 engages frame assembly 206. Interior mesh 374 is engaged by the tubular periphery 372. Tubular periphery 372 includes a pair of side wall sections 376, 378 for engaging side tubes 216 and 218, a lower wall section 380 for engaging lower tubes 212, 214, and an upper wall section 382 for engaging upper tubes 208, 210. Each of the side wall sections 376, 378 is a sheet of nylon folded over to form a tubular portion 384 formed by stitching 386. Side tubes 216, 218 run through the tubular portions 384. Inner edges of side wall sections 376, 378 are engaged by stitching 387 to side edges of mesh 374. Lower wall section 380 is a sheet of nylon folded over to form a tubular portion 388 through which lower tubes 212, 214 run. Tubular portion 388 is formed by stitching 390 that also engages lower wall section

380 to the lower edge of mesh 374. Upper wall section 382 includes a sheet of nylon folded over to form a tubular portion 392 through which upper tubes 208 and 210 run. Tubular portion 392 is formed by stitching 394 that also engages the upper wall section 382 to the upper edge of mesh 374. Tubular portion 392 is of sufficient size such that, when fabric wall 370 is removed from frame assembly 206, the hinge mechanism 220 can slide through the tubular portion 392. Upper wall section 382 further includes a sheet of cushion 394 or resilient material engaged to the underside of the sheet of nylon so as to pad the upper tubes 208, 210 and hinge mechanism 220 relative to a person sleeping in bed 24. Besides being engaged to the nylon mesh 374, each of the wall sections 376, 378, 380 and 382 are engaged to adjacent wall sections via stitching 386, 390 and 394 so as to provide strength to the fabric wall 370. In other words, lower wall section 380 is engaged by stitching 386 and 390 to side wall sections 376, 378, and upper wall section 382 is engaged by stitching 386 and 394 to side wall sections 376, 378. When rail portion 204 is swung relative to leg portion 202, tubular portion 388 pivots relative to tubes 212, 214.

Fabric wall 370 is removable from frame assembly 206 by 1) first depressing a button in the upper ends of side tubes 216, 218 so as to disconnect the side tubes 216, 218 from the upper connections 222, 224, 2) then sliding the side wall sections 376, 378 off the side tubes 216, 218, 3) then sliding the upper wall section 382 off of tubes 208 and 210 and hinge mechanism 220, and 4) then sliding the lower wall section 380 off tubes 212, 214. Such steps need not take place in such order; however, prior to removing upper wall section 382, the side tubes 216, 218 are disconnected from the upper connections 222, 224.

As shown in FIG. 9, bed rail 200 generally includes a leg portion 202 and a rail portion 204. Leg portion 202 includes the base leg section 250 having the proximal end portion 248 which is engaged in lower connections 226, 228 with pin 252. As noted above, female receptor 246 is oblong in section and base leg section 250 is oblong in section to minimize relative rotation between female receptor 246 and base leg section 250. As shown in FIG. 10, base leg section 250 includes a distal end male portion 400 having a button 402. Button 402 is inclined on its distal side 158 and runs vertically on its proximal side 160. Base leg section 250 is tubular and is preferably formed of steel.

As shown in FIGS. 9 and 10, leg portion 202 may include a first embodiment of a counter attachment. This counter attachment or counter section, designated by reference numeral 404, includes a generally linear female tube portion 406 having a proximal end portion 408 and a distal end portion 410. Proximal end portion 408 is a female receptor for male portion 400 of base leg section 250 and includes oblong slots 412 for engaging button 402. Slots or detents 412 are arranged in the axial direction along the upper side of counter attachment 404 and provide for length adjustment of leg portion 202 by selective engagement with button 402.

Counter attachment 404 further includes a counter 414 extending at a generally right angle relative to generally linear tube portion 406. Counter 414 extends integrally from distal end portion 410 and is one-piece with linear tube portion 406. Counter 414 includes a cap 416. Counter 414 is rigid relative to generally linear tube portion 406 and keeps the mattress 16 sandwiched between the rail portion 204 and the counter 414.

As shown in FIG. 7D and FIG. 10, button 402 includes the structure of button 150 and includes a vertical side 160 and an inclined or tapering side 158, where vertical side 160 is faces the rail portion 204 and where the tapering side 158 faces the counter 414 such that leg portion 202 may be decreased in length with a relative minimum amount of effort and such that leg portion 202 may be increased in length only with a relative maximum amount of effort. Tapering side 158 is a quick connect mechanism. Vertical side 160 is not a quick connect mechanism and requires hand operation directly on the button for operation. In other words, with such a structure provided to button 402, namely tapering side 158, counter attachment 404 is readily slid onto base leg portion 250 with no need to depress button 402 such that the rail portion 204 can readily hug the first side 26 of mattress 16 and such that there is no gap between the rail portion 204 and the first side 26 of mattress 16. With such a structure provided to button 402, namely vertical side 160, leg portion 202 cannot be increased in length, which would create a gap between the rail portion 204 and the first side 26 of mattress 16, without depressing button 402 because the vertical side 160 prevents counter attachment 404 from sliding out of base leg section 250.

It should further be noted that, with the counter attachment 404 and the base leg section 250 being oblong in section, rotation between the counter attachment 404 and base leg section 250 is minimized. Further, as noted above, rotation between base leg section 250 and its respective connection 226, 228 having oblong female receptor 246 is minimized. Hence counter 414 is maintained in an upright position against the second side 28 of mattress 16.

The oblong shape to female receptor 246, base leg section 250, counter attachment 404 and counter attachment 420 further maximizes the flatness of such members so as to minimize any bumps that may manifest themselves at the upper surface of the mattress 16.

Figure 11:
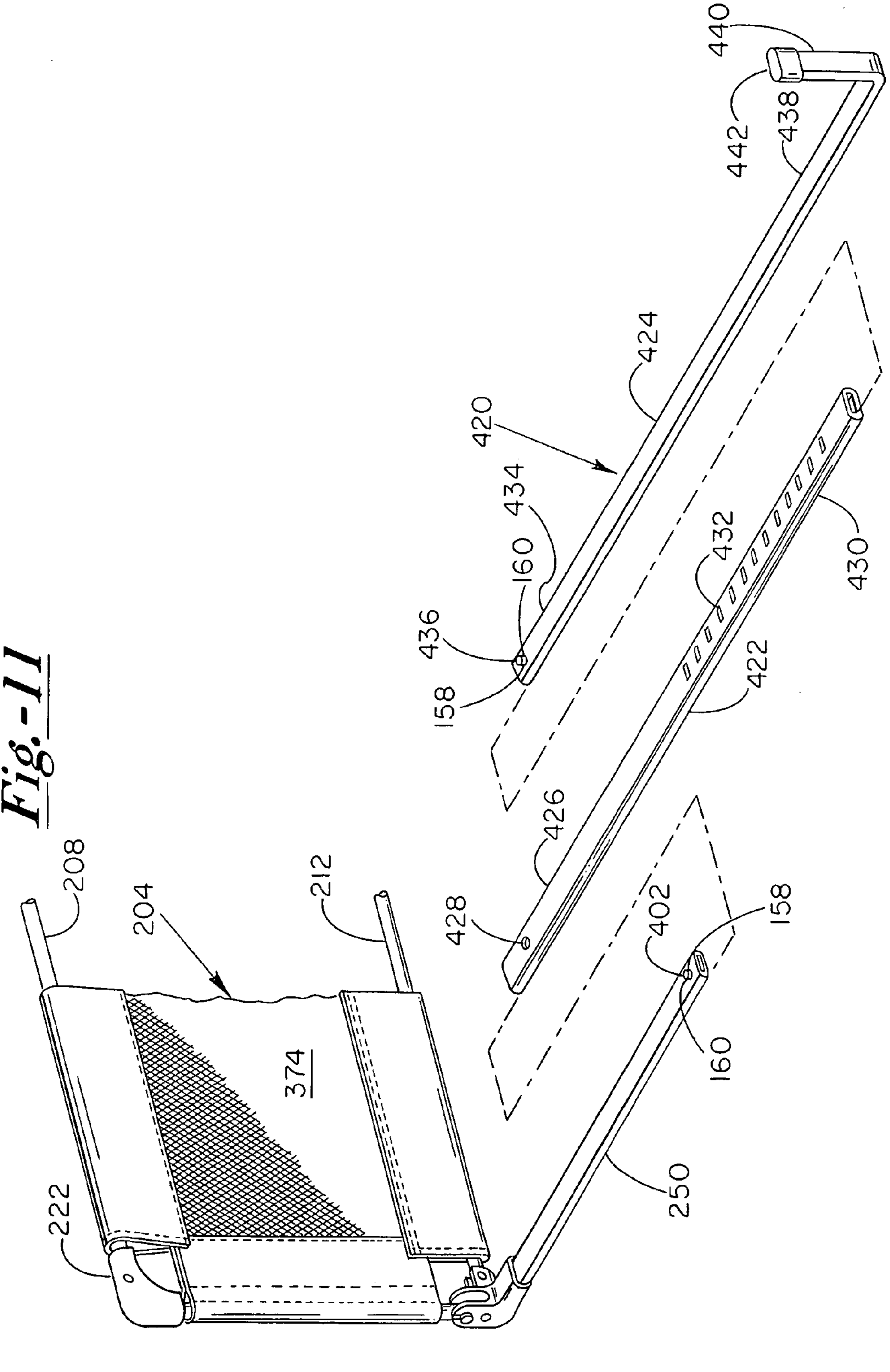
FIG. 11 is a partial, perspective view of the bed rail of FIG. 9 wherein the leg of the bed rail includes a second embodiment of a counter attachment.

As shown in FIG. 11, leg portion 202 may include a second embodiment of a counter attachment. This counter attachment, designated by reference numeral 420, includes a tubular medial section 422 and a tubular counter section 424. Medial section 422 includes a proximal female end 426 having a circular hole 428 for reception of button 402 of base leg section 250. Medial section 422 includes a distal end female portion 430 having a set of oblong slots or detents 432 arranged in the axial direction on the upper side of medial section 422. Openings 432 (oblong slots) are of a different shape than opening 428 (a circular hole) to make assembly of the bed rail 200 user friendly, based upon sight, for the customer.

Tubular counter section 424 includes a proximal end male portion 434 having a button 436 that includes the structure of button 150 of FIG. 7D. That is, button 436 includes a vertical side 160 and a tapering side 158 such that counter section 424 can be easily slid into the medial section 422 so as to decrease the effective length of one of the legs of leg portion 202. Button 436 hence selectively cooperates with one of the slots or detents 432 of medial section 422. Counter section 424 further includes a distal end portion 438 and a counter 440 extending at a right angle from the distal end portion 438. A plastic safety cap 442 caps the end of the counter 440. Counter 440 is rigid relative to distal end portion 438. Vertical side 160 of button 436 faces counter 440. Tapering side 158 of button 436 faces the absolute proximal end of counter section 424 so as to face the rail portion 204.

As with counter attachment 404, each of medial section 422, counter section 424 and base leg section 250 is oblong in cross section such that rotation among the sections 422, 424 and 250 is minimized so as to keep counter 440 in an upright position on the second side 28 of mattress 16.

As with counter attachment 404, merely a relative minimum amount of effort is required to decrease the effective length of counter attachment 420, given the relative orientations of tapering sides 158 of buttons 436 and 402, such that the creation of any gap between the bed rail 200 and the first side 26 of mattress 16 is prevented. As with counter attachment 404, a relative maximum amount of effort is required for increasing the effective length of counter attachment 420 because of the relative orientations of vertical sides 160 of buttons 436 and 402 so as to minimize the creation of any gap between the bed rail 200 and the first side 26 of mattress 16.

Counter attachment 404 may be utilized for a relatively small bed. Counter attachment 420 may be utilized for a relatively large bed.

It is noted that, to increase the length of counter attachments 404 and 420, effort is maximized in at least two ways. First, to gain access to the counter attachments, 404 and 420, the mattress 16 must be lifted off the counter attachments 404 and 420. Since the counters 414, 440 are maintained at an upright position, it is difficult to simply pull the bed rail 200 from between the mattress 16 and the box spring 18. Second, once access is gained to the counter attachments 404 and 420, buttons 402, 436 must be depressed and then redepressed for each of their respective slots 412, 432 while the female section 406 is being removed from section 250 (or slid outwardly relative to each other) and while sections 422 and 424 are being separated (or slid outwardly relative to each other). Such a depression and a redepression takes time and effort and such a depression and redepression is preferred. Buttons 402 and 436 are resilient and spring based such that their bias is to the outer locked position and such buttons 402 and 436 pop out of slots 412 and 432 as sections are being slid relative to each other.

Figure 12:
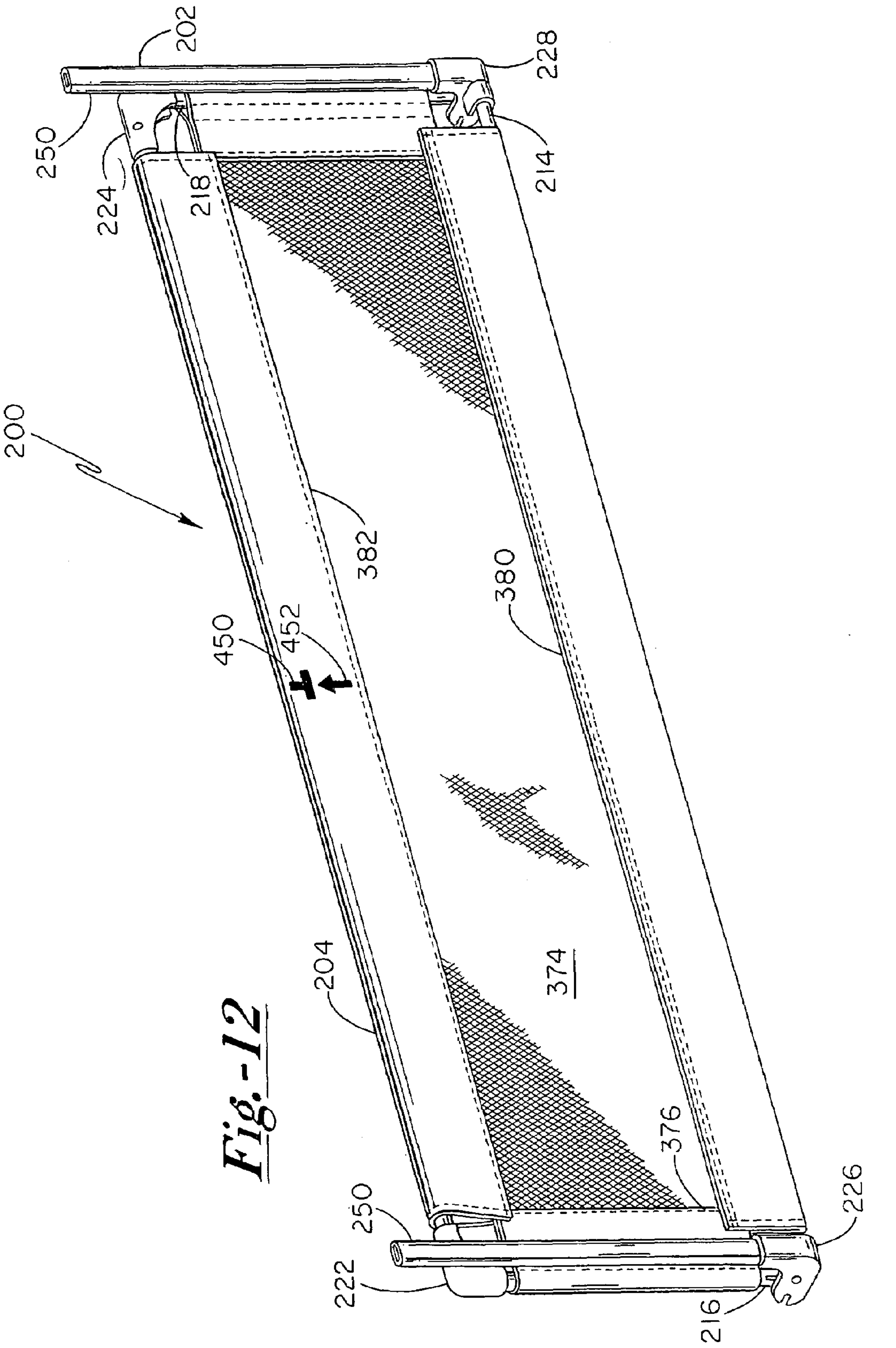
FIG. 12 is a perspective view of the bed rail of FIG. 9 and shows the base of the leg without attachment of any of the first or second embodiments of the counter attachment.

FIG. 12 shows the bed rail 200 in the process of being folded to a compact configuration. Leg portion 202 and rail portion 204 have been swung relatively to each other by the operation of connections 226 and 228 such that base leg sections 250 are disposed generally parallel to side tubes 216 and 218. From the position shown in FIG. 12, lower tubes 212, 214 are disconnected from the connections 226, 228 and the lower tubes 212, 214 are slid out of the lower wall section 380. Then the hinge connection 220 is squeezed so as to operate the unlocking mechanism 342. Indicia 450 is provided on the upper wall section 382 to indicate the location and general structure of the hinge mechanism 220 and unlocking mechanism 342. An arrow indicia 452 is provided on the upper wall section 382 below indicia 450 and points at indicia 450 to indicate the direction the unlocking mechanism 342 slides to unlock the hinge mechanism 3220. Upon an unlocking of the upper tubes 208, 210 relative to each other, the outer ends of the bed rail 200 can be swung upwardly with the base leg sections 250 to the compact storage configuration shown in FIG. 13.

Figure 13:
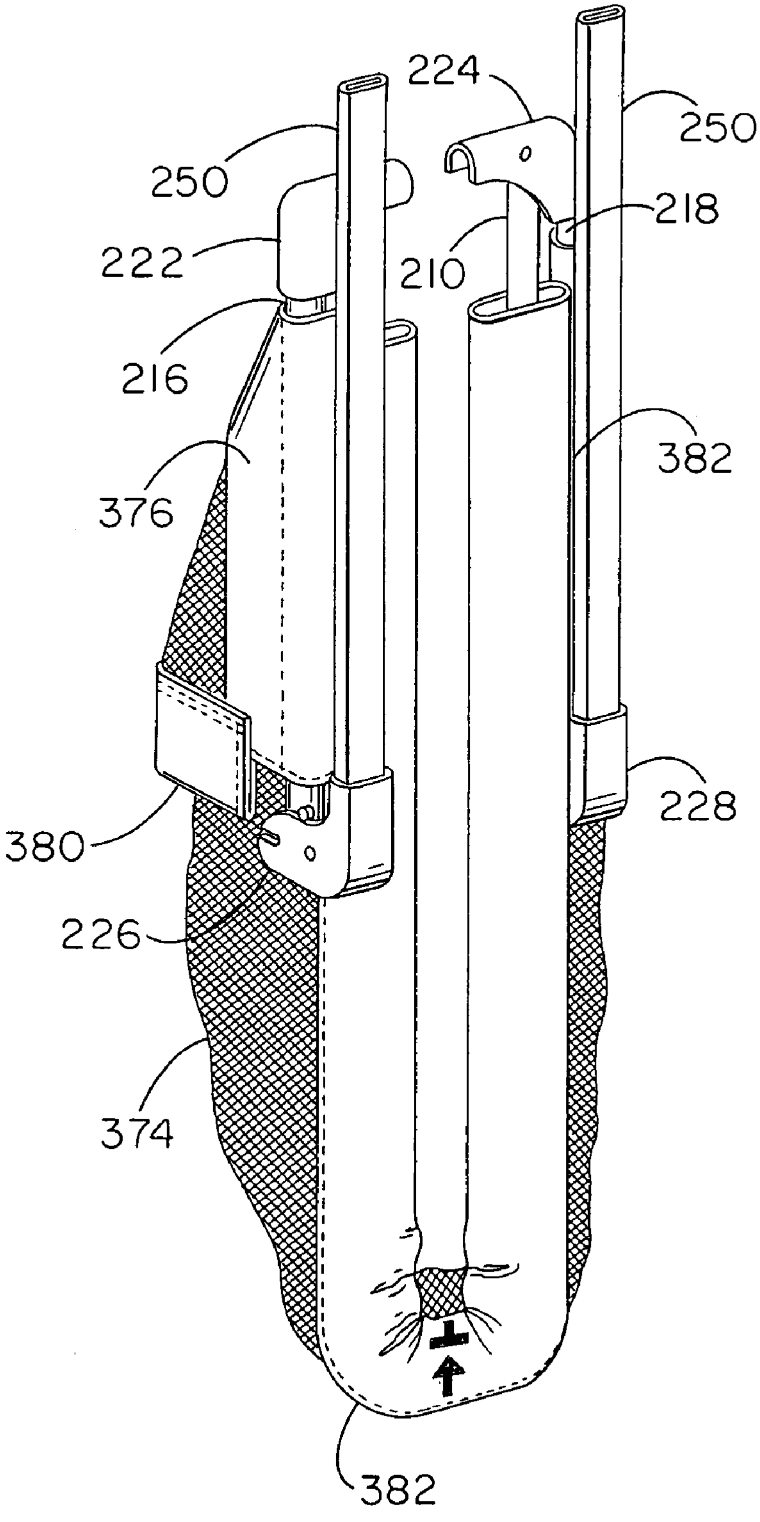
FIG. 13 is a perspective view of the bed rail of FIG. 12 in a folded compact position.

In a stored configuration as shown in FIG. 13, bed rail 200 with each of the counter attachments 404 and 420 can fit in a nylon drawstring bag where the bag measures about seven inches in diameter and about 30 inches in depth.

FIG. 18 shows the preferred embodiment for lower connection 226 (and 228). In this preferred embodiment, side tube 216 (or 218) is preferably set at an acute angle A relative to leg portion 202, including leg base section 250. In other words, the following features are aligned on an axis B: side tube 216 (or 218), slots 288, slots 270, pin 290, walls 242 and 244. The following features are aligned on an axis C: female receptor 246, base leg section 250, and counter attachments 404 and 420 (excluding the counters 414 and 440). Axis B is preferably set at acute angle A relative to axis C. Body 240 is molded and its inner steel bracket is fabricated such that its features on axis A, including the opening for pin 290 and slots 270, is set at acute angle A relative to female receptor or sleeve 246.

Such an acute angle A works to minimize any gap between the first side 26 of mattress 16 and the rail portion 204 for a number of reasons. First, because of the acute angle, the rail portion 204 lies closer to the upper side of mattress 16 than the lower side of the mattress 16. The rail portion 204 is needed at the upper side to prevent a person from rolling off of the bed 24. Second, except for perhaps high tech excessively expensive mechanical arrangements such as found at NASA, mechanical arrangements may loosen over time. The provision of features providing for angle A minimizes the chance that the angle A would become obtuse, i.e., greater than ninety degrees, whereby the rail portion 204 would extend upwardly and away from the first side 26 of mattress 16. Third, angle A works in combination with counter attachments 404 and 420 where the sections of the counter attachments are readily slideable relative to each other to decrease the effective length of the legs of leg portion 204. In other words, as to this third point, mattress 16 may be hugged more tightly between counters 414 (or 440) and the rail portion 204 because acute angle A permits the rail portion 204 to give somewhat. Rail portion 204 gives somewhat because of the mechanical arrangement of the rail portion 204 as a whole, because of the mechanical connection between rail portion 204 and the lower connections 226, 228, because of the mechanical hinge arrangement 220 and because of the mechanical frame assembly 206. In light of the above three factors, the chances that rail portion 204 closely confronts the upper face of the mattress 16 at first side 26 of mattress 16 are maximized.

FIG. 19 shows rail portion 204 swung downwardly relative to the leg portion 202. When the bed rail 200 is not in use, such as during daytime hours, the rail portion 204 is swung downwardly by disengaging rollers 272 from slots 270 on the lower connections 226, 228 and pivoting the rail portion 204 as a whole against the first side 26 of the box spring 18. When swung downwardly, side rails 216, 218 confront stops 460 (shown in FIG. 15A and FIG. 19) of sleeve or receptor 246. To place the rail portion 204 into the upright operating position, rail portion 204 is swung upwardly such that rollers 272 roll against peripheral surface 294 and such that rollers 272 then snap into detents 270 under pressure from the coil springs 282 whereupon the rail portion 204 is locked relative to the leg portion 202.

FIG. 19 shows that tubes 216, 218 can be swung from the downward position shown in FIG. 19, to the upright operating position shown by first arrowhead 462, to the folded position shown by second arrowhead 464 such that tubes 216, 218 can be swung through about a 270 degree arc relative to leg portion 204.

Figure 20A:
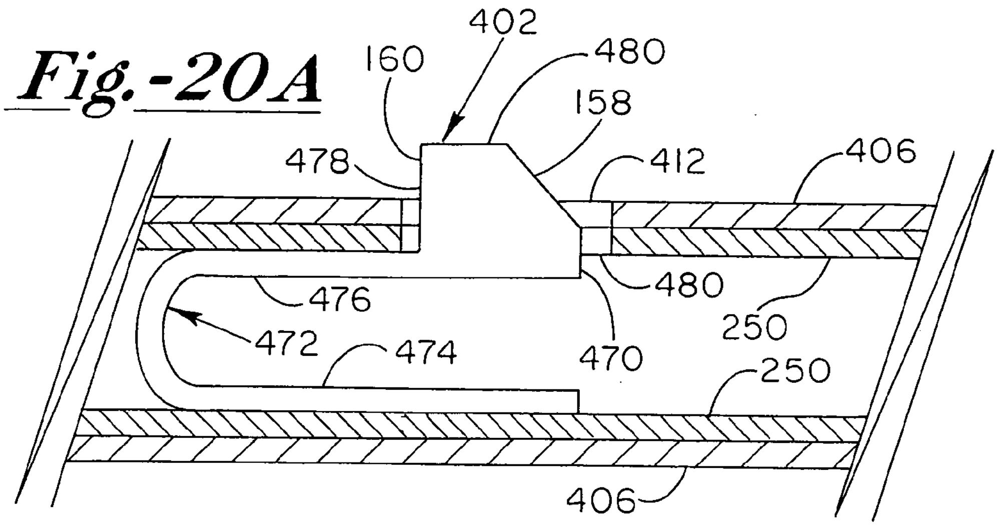
FIG. 20A is a section view of the leg portion of FIG. 9 having the preferred embodiment of the one directional quick connect.
Figure 20B:
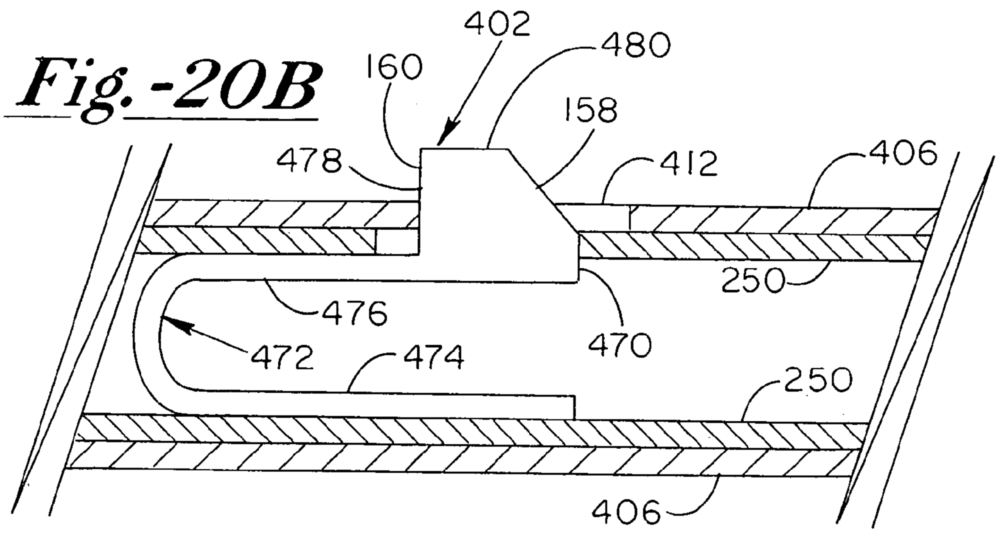
FIG. 20B is a section view of the leg portion of FIG. 9 having the preferred embodiment of the one directional quick connect where the one directional quick connect prevents an increase in the length of one of the legs of the leg portion of the present bed rail.
Figure 20C:
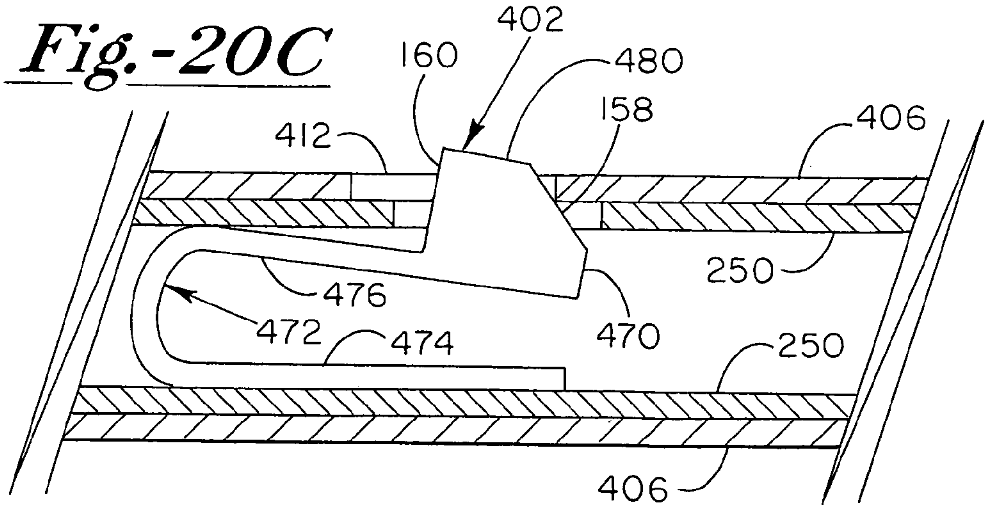
FIG. 20C is a section view of the leg portion of FIG. 9 having the preferred embodiment of the one directional quick connect where the one directional quick connect permits a decrease in the length of one of the legs of the leg portion of the present bed rail.

FIGS. 20A, 20B and 20C show the preferred embodiment for button 402 (and for button 436). Button 402 includes the tapering face 158 and the vertical face 160. Button 402 further includes a second vertical face 470 opposite of vertical face 160 and running generally parallel thereto. Button 402 is a spring that during manufacture is slid into base leg section 250 and does not need to be affixed to base leg section 250. More specifically, button 402 includes a spring 472 having a base arm 474 and an upper arm 476. Upper arm 476 includes a head 478. Head 478 includes the vertical surfaces 160, 470 and the tapering surface 158.

Head 478 further includes an upper surface 480 with which a finger may make contact to depress the head 478. From a top view, head 478 is round, as shown in FIG. 9.

Vertical surface 160 of head 478 can extend through opening 480 in base leg section 250 and can further extend through opening 412 in section 406. Vertical surface 470 of head 478 can extend through opening 480 in base leg section 250 and cannot extend through opening 412 in section 406. Tapering surface 158 of head 478 cannot extend through opening 480 in base leg section 250 when the spring 472 is fully extended (not depressed) and can extend through opening 412 in section 406 when the spring 472 is fully extended (not depressed). In other words, when the spring 472 is fully extended, the intersection or juncture of tapering surface 158 and vertical surface 470 is disposed about at the juncture of the upper outer surface of base leg section 250 and the lower inner surface of section 406.

FIG. 20B shows that when one attempts to increase the length of leg portion 202, a portion of section 406 forming slot 412 brings pressure to bear upon vertical surface 160 of head 478, which in turn may slide the button 402 toward the opposite edge of opening 480 until vertical surface 470 of head 478 abuts such opposite edge of opening 480 formed in base leg section 250, which prevents further sliding of the section 406 relative to base leg 250 in the direction of sliding that was attempted. Such further sliding is permitted only by depressing button 402 by an outside object such as a finger, wherein button 402 is depressed into base leg section 250.

FIG. 20C shows that sliding in the other direction (the direction opposite to that shown in FIG. 20B) is permitted, without a finger depressing the button 402. Here, upon sliding in such opposite direction, a portion of section 406 forming slot 412 brings pressure to bear upon tapering surface 158, which automatically depresses the head 478 into base leg section 250 and permits such sliding to continue. Accordingly, length of leg portion 402 is decreased with a minimal amount of effort.

As noted above, button 436 includes the same structure as button 402. Hence, button 436 includes the second vertical surface 470 opposite of vertical surface 160. However, whereas tapering surface 158 of button 402 faces the direction of counters 414 and 440, tapering surface 158 of button 436 faces the direction of the rail portion 204. Thus, with counter attachment 420, decreasing the length of a leg of leg portion 202 is relatively easy, because section 422 encounters the tapering side 158 of button 402 when being pushed onto base leg section 250 and because the tapering surface 158 of button 436 encounters the slot edges of slots 432 when section 424 is being pushed onto section 422. Conversely, increasing the length of counter attachment 420 is relatively difficult because the vertical surfaces 160 and 470 are encountered.

In operation, the bed rail 200 is removed from the factory provided box or bag with the fabric wall 370 already engaged to the frame assembly 206. Then tubes 212, 214 may be engaged to each other and further engaged in their respective cradles 254 to hold the lower end portions of side tubes 216, 218 in a spaced apart rigid relationship via the absolute ends of the tubes 212, 214 confronting and abutting the lower connections 226, 228. Then base leg sections 250 may be swung such that rollers 272 engage detents 270 and such that base leg sections 250 are set at an acute angle relative to rail portion 204. Base leg sections 250 may then be tucked into the first side 26 of the bed 24 between the mattress 16 and the box spring 18. Then either of the counter attachments 404, 420 is engaged to the base leg sections 250 by sliding the counter attachment into the second side 28 of the bed 24 between the mattress 16 and the box spring 18 until the counter attachments 404 (or 420) meets with and is engaged to base leg section 250. (If counter attachment 420 is used, medial section 422 may be first attached to the base leg section 250 or may be first attached to counter section 424). Here, it should be noted that, since slots 412, 432 are provided on only one side of the counter attachments 404, 420, the counter 414 (or 440) can not be locked into the downward position, such as against box spring 18. Then, with the mattress 16 between the upright and locked rail portion 204 and the counter 414 (or 440), the counter 414 and rail portion 204 are pushed relatively toward each other until the mattress 16 is tightly hugged and until the rail portion 204 abuts the upper surface of the mattress 16 at the first side 26 of the mattress 16 such that no gap exists therebetween and a person may safely sleep upon the mattress 16. During daytime hours, the rail portion 204 may be swung down to the out-of-the-way position shown in FIG. 19, and then swung upwardly at bedtime to the upright operating and locked position shown in FIG. 18. To make the effective length of the leg portion 202 greater, a relative great amount of effort is required. Mattress 16 must be taken off of the leg portion 204 or access must otherwise be gained to buttons 402 (or 402 and 436) and then buttons 402 (or 436) must be repeatedly depressed as section 406 (or 424) is drawn out of its cooperating leg section and drawn away from rail portion 204. To fold the bed rail 200, lower tubes 212, 214 are removed from their cradles 254 and the counter attachments 404 (or 420) are removed from their base leg sections 250. Rollers 272 are unlocked from their detents 270 and base leg sections 250 are swung up to be parallel to side tubes 216, 218. Then hinge mechanism 220 is unlocked by unlocking mechanism 342 such that upper tubes 208, 210 may be swung to confront and be parallel with side tubes 216, 218 and the pair of base leg sections 250, as shown in FIG. 13, whereby six tubes are generally parallel with each other.

Figure 21:
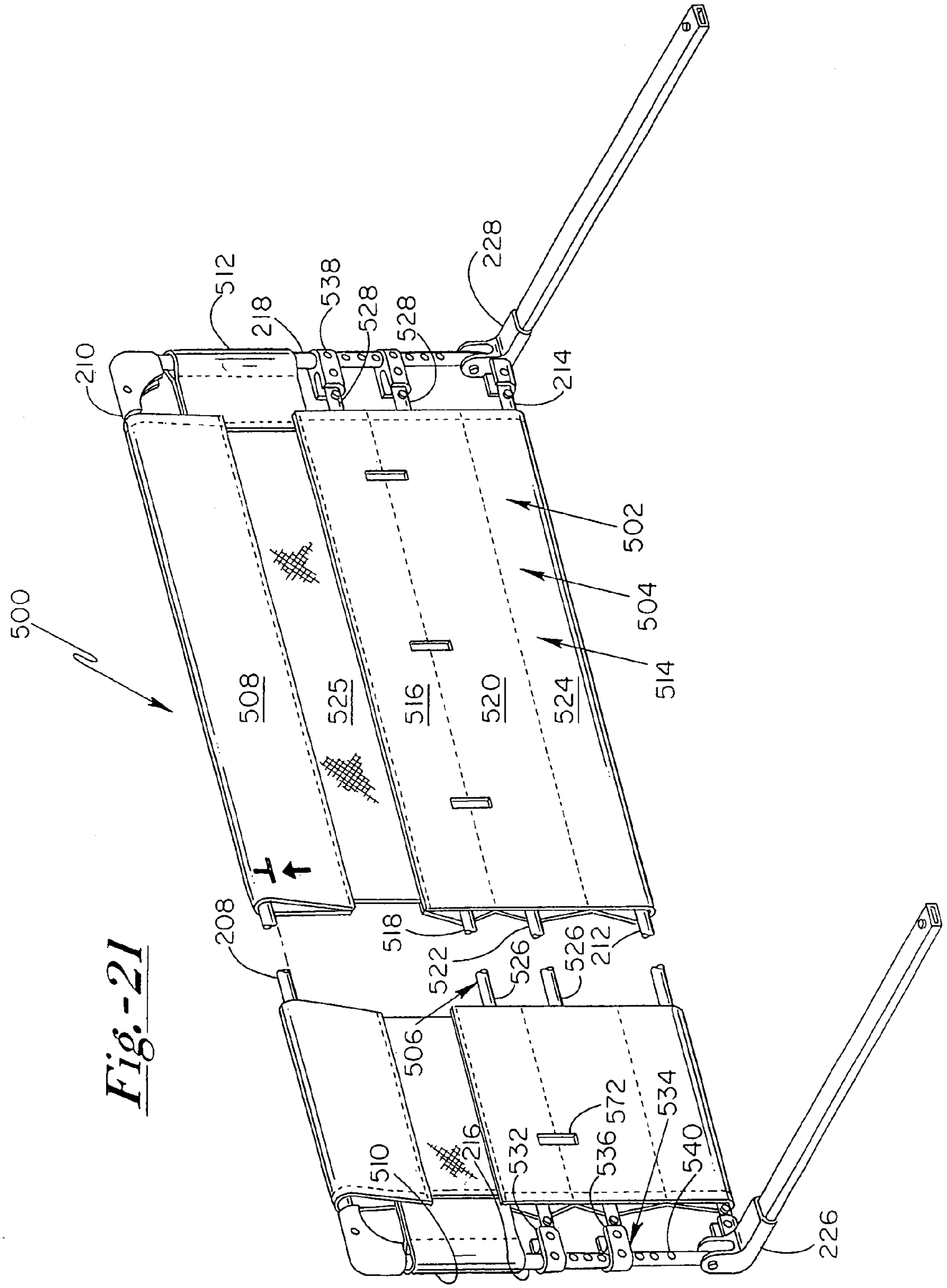
FIG. 21 is a perspective view of another embodiment of the bed rail of the present invention where such bed rail includes tubing in the wall of the rail portion, where the tubing is disposed in the plane of the sleeping surface, and where a lower three point connection is utilized.

FIG. 21 shows an embodiment of a bed rail 500 of the present invention where a wall 502 having tubing as a rigid component is engaged to the frame assembly 206. Wall 502 includes sheeting 504 and tubing 506.

Sheeting 504 includes an upper sleeve or tubular portion 508 for engaging the upper tubes 208, 210 and the hinge mechanism 220, a side sleeve or tubular portion 510 for engaging side tube 216, a side sleeve or tubular portion 512 for engaging side tube 218, and a lower multiple sleeve or tubular portion 514. Multiple sleeve 514 includes a sleeve portion 516 for engaging rigid tubing 518 that lies in the plane of a sleeping surface 519 and that confronts the sleeping surface 519 and first side 26 of the mattress 16. Multiple sleeve 514 further includes a sleeve portion 520 for engaging rigid tubing 522 that confronts the first side 26 of the mattress 16 below the sleeping surface 519. Multiple sleeve 514 further includes a sleeve portion 524 for engaging lower rigid tubes 212 and 214. Sheeting 504 further includes a resilient mesh 525 engaged to inner edge portions of sleeves 508, 510, 512 and 514. Further, for reinforcement, sleeves 508, 510, 512 and 514 are engaged to each other at corner portions.

Tubing 518 lies in the plane of the sleeping surface 519 of mattress 16. Tubing 522 lies between the plane of the sleeping surface 519 and the plane of the lower nonsleeping face 530 of mattress 16.

Each of tubing 518 and 522 includes tubes 526, 528 that are identical to tubes 212, 214. In other words, each of the tubes 526, 528 includes outer button 262 that may be operated by inner button 264. Further, the tubes 526, 528 engage each other via their inner ends via a female/male connection having aperture 302, male end portion 304, and button 306.

Outer ends of tubes 526, 528 engage cradles 532 that are identical to cradles 254. Cradle or trough is a semi-circular open end receptor having a pair of aligned through holes 260 for button 262. The outer ends of tubes 526, 528, respective buttons 262, 264, respective cradles 532, and respective holes 260 may be referred to as first quick connects.

Cradle or trough 532 is one-piece and integral with the plastic body 536 of a height adjustment mechanism 534. Plastic body 536 is generally cylindrical in shape and fits in a snug fashion on its respective side tube 216 or 218. As well as plastic body 536, height adjustment mechanism 534 includes a pin 538 that ties the plastic body 538 to side tube 216 or 218. In some cases, pin 538 is selected to be a set screw that bites into the outer surface of tube 216 or 218, and each of the height adjustment mechanisms 534 may have a pair of set pins opposing each other. In other cases, pin 538 may be a permanent or removable rivet that passes diametrically through tube 216 or 218. In other cases, pin 538 may be a removable screw that passes diametrically through tube 216 or 218, where tubes 216 and 218 have a number of openings 540 at different heights. Height adjustment mechanism 534, including plastic body 536, pin 538 and openings 540, may be referred to as a second quick connect. Where the pin 538 is a set screw, incremental height adjustment of tubing 518 is possible. Where openings 540 are utilized with a rivet or screw, the degree of height adjustment is dependent upon the number of openings 540.

With such height adjustment mechanism or second quick connect 534, tubing 518 may be locked in the plane 519 of a sleeping surface of a relatively thick mattress 16 or a relatively thin mattress 16. With such height adjustment mechanism or second quick connect 534, tubing 522 may be locked relatively closely or relatively far away from the plane 519 of a sleeping surface.

Tubing 518 and 522 make the wall 502 relatively rigid. Tubing 518 makes the wall 502 rigid at the plane of the sleeping surface 519. Such a rigid feature further maximizes the closing off of any gap that is formed between bed rail 500 and the first side 26 of mattress 16. Tubing 522 makes the wall 502 rigid at a selected location below, yet relatively close to, the plane of the sleeping surface 519. Such a further rigid feature even further maximizes the closing off of any gap that is formed between bed rail 500 and the first side 26 of mattress 16. Further, multiple sleeve 514 has relatively great rigidity overall with tubing 518 and adjacent tubing 522. Such a still further rigid feature yet even further maximizes the closing off of any gap that is formed between bed rail 500 and the first side 26 of mattress 16.

Figure 22:
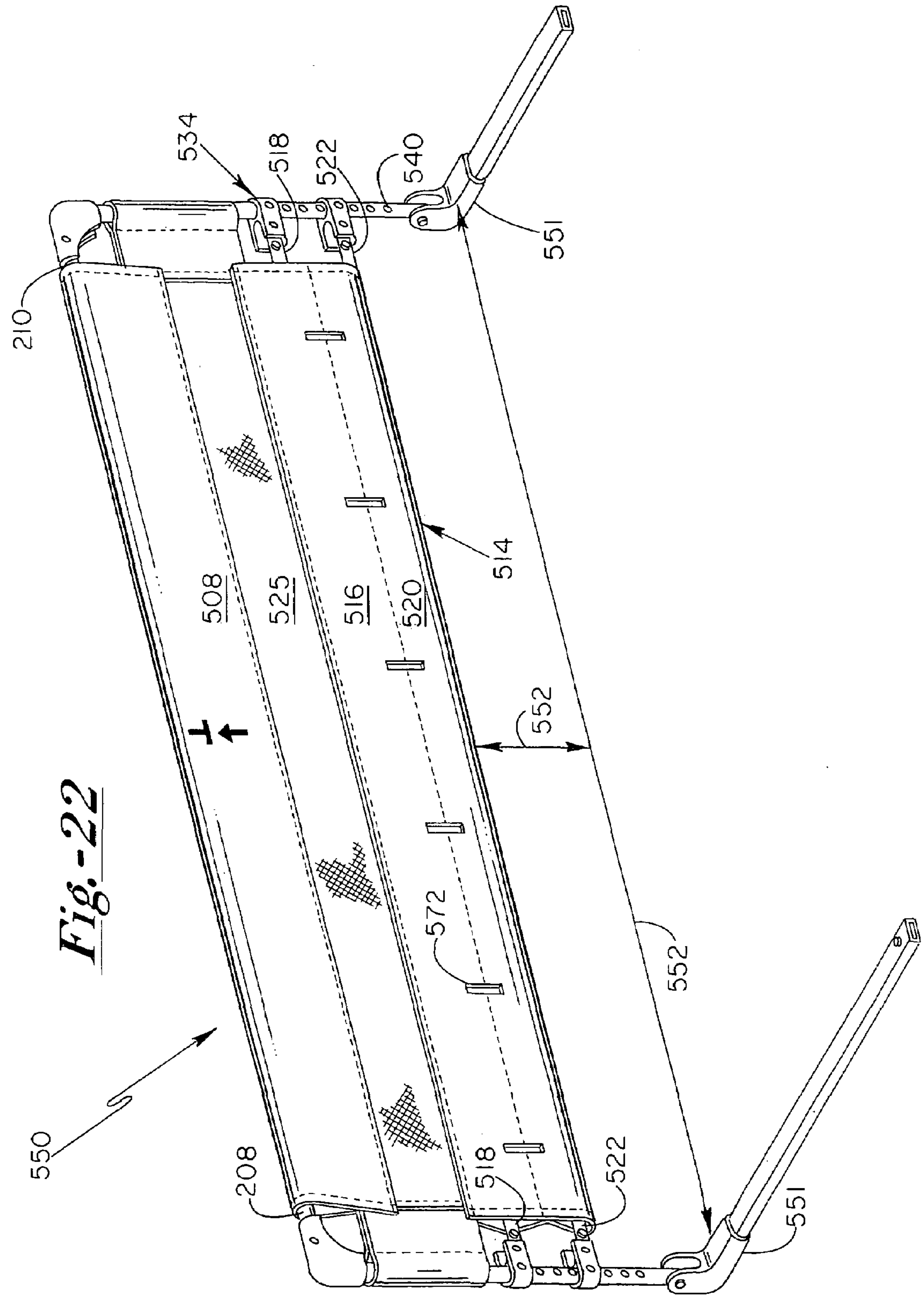
FIG. 22 is a perspective view of another embodiment of the bed rail of the present invention where such bed rail includes tubing in the wall of the rail portion, where the tubing is disposed in the plane of the sleeping surface, and where a lower two point connection is utilized.
Figure 23:
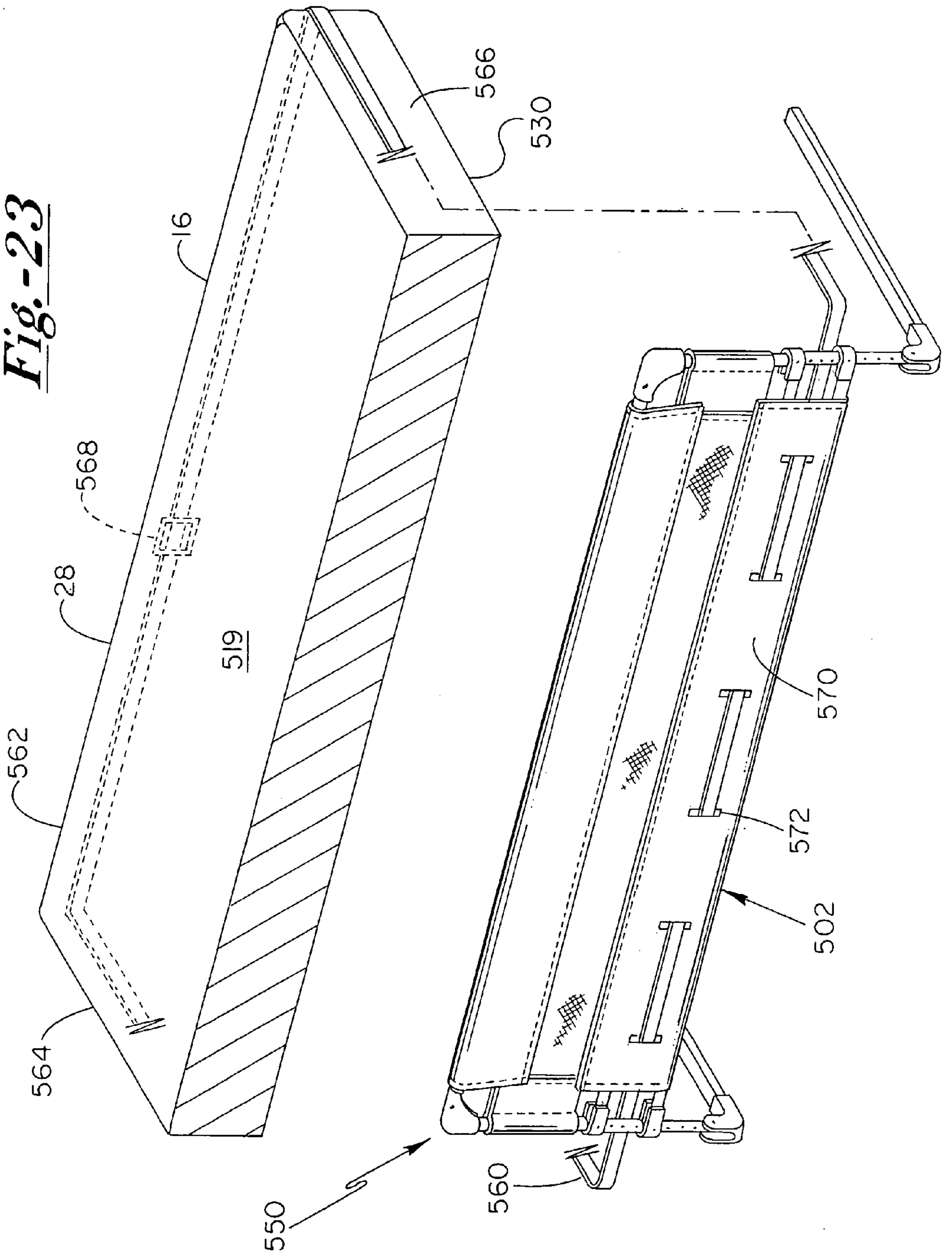
FIG. 23 is a perspective view of the bed rail of FIG. 22 having a strap for directly drawing the wall of the bed rail against a mattress and indirectly drawing the frame of the bed rail against the mattress.

Another embodiment of the present invention is shown in FIGS. 22 and 23 and includes bed rail 550. Bed rail 550 includes no lower tubes 212, 214 and no cradles 254. The three-point connections 226, 228 therefore become two-point connections 551 (having no cradles 254) and otherwise remain the same. Connections 551 are thereby simplified and manufacturing costs are decreased. Raw material cost is also decreased for bed rail 550 since lower tubes 212, 214 are no longer required and, it should be noted, the absence of tubes 212, 214 is preferred. It should further be noted that tubing 518 and 522 are preferably formed of a metal such as stainless steel or aluminum. Further, multiple sleeve 514 is reduced in size and includes no sleeve 524 to further save raw materials.

With bed rail 550, tubing 518 is preferably set in the plane of the sleeping surface 519 and tubing 522 is preferably located between the plane of the sleeping surface 519 and the plane of the lower face 530 of the mattress 16.

With bed rail 550, a generally rectangular space 552 is thereby formed below tubing 522 and between side tubes 216 and 218. The provision of this space 552 maximizes the flow of air and thus oxygen to any gap that would be formed between bed rail 550 and the first side 26 of mattress 16.

Each of bed rails 500 and 550 may include a peripheral strap 560 for even further minimizing any gap that may be formed between a bed rail and the first side 26 of mattress 16 by drawing bed rail 500 or 550, or more particularly the wall 502, against the first side 26 of the mattress 16. Mattress 16 includes a periphery 562. Mattress periphery 562 includes the first side 26, which runs into a head side or end 564, which runs into the second side 28, which runs into the foot side 566, which runs into the first side 26. Peripheral strap 560 engages each of sides 26, 564, 28 and 566.

Peripheral strap 560 further includes a locking buckle 568 for engaging opposite ends of strap 560 and for drawing wall 502 against the first side 26 of mattress 16. The ends of strap 560 and locking buckle 568 may be oriented at a number of positions, such as on the second side 28 of mattress 16, or on the outer face 570 of bed rail 500 or 550, or on the head side 564 or foot side 566 of mattress 16, or adjacent to side tubes 216, 218.

Peripheral strap 560 is preferably engaged to the wall 502 of bed rail 500 or 550 instead of to the frame such as to tubes 216, 218, though connection to the frame is possible. The reason why engagement of strap 560 directly to the wall 502 is preferred is to draw features of the wall 502, such as tubing 518 and tubing 522, directly to the first side 26 of mattress 16. One means of such an engagement is to avoid wrapping strap 560 about the outer faces of side tubes 216, 218 and instead run the strap 560 across the inner faces of side tubes 216, 218. Strap 560 is engaged to the wall 502 preferably with a weaving engagement utilizing slots 572 formed in multiple sleeve 514. Slots 572 are preferably located in and between tubing 518 and tubing 522. Slots 572 are preferably elongate in height such that strap 560 may be located relatively close to or relatively far from tubing 518. A weave engagement between strap 560 and wall 502 is preferred because such an engagement is dependent less upon a stitching or gluing or welding engagement that may disengage from the wall 502.

It should be noted that bed rails 500 and 550, except as noted above, otherwise include the features of bed rail 200, including the features of leg portion 202 and rail portion 204. However, peripheral strap 560 is a counter such that the counter attachments 404 and 420 may or may not be used in combination with peripheral strap 560. It can be appreciated that counter attachments 404 and 420 work directly on the frame (such as side tubes 216, 218) of the bed rail 200, 500, 550 while the counter or strap 560 works directly on what is within the frame of the bed rail 200, 500, 550 such that counter attachments 404, 420 may work in combination with counter or strap 560.

As noted above, strap 560 is engaged to the wall 502 of the bed rail 500 or 550 and runs between side tubes or portions 216, 218 and the first side 26 of mattress 16. In other words, the side tubes 216, 218 include first faces that are oriented toward the direction in which leg portion 202 extends from wall 502, and the strap 560 confronts these inner first faces of the side tubes 216, 218, as shown in FIG. 23, when the strap 560 is engaged on the mattress 16 such that the wall 502 of bed rail 500 or 550 is directly drawn against the mattress 16 and such that side tubes 216, 218 are indirectly drawn against the mattress 16.

If desired, the strap 560 may confront the opposite face of tubes 216, 218 (i.e., the face opposite the first side 26 of mattress 16) such that the side tubes 216, 218 and the frame of the bed rail 500 or 550 are drawn directly against the first side 26 of the mattress 16 and such that the wall 502 is indirectly drawn against the first side 26 of the mattress 16. However, such is not preferred because such a structure may leverage the wall 502 out away from the first side 26 of mattress 16.

Figure 24:
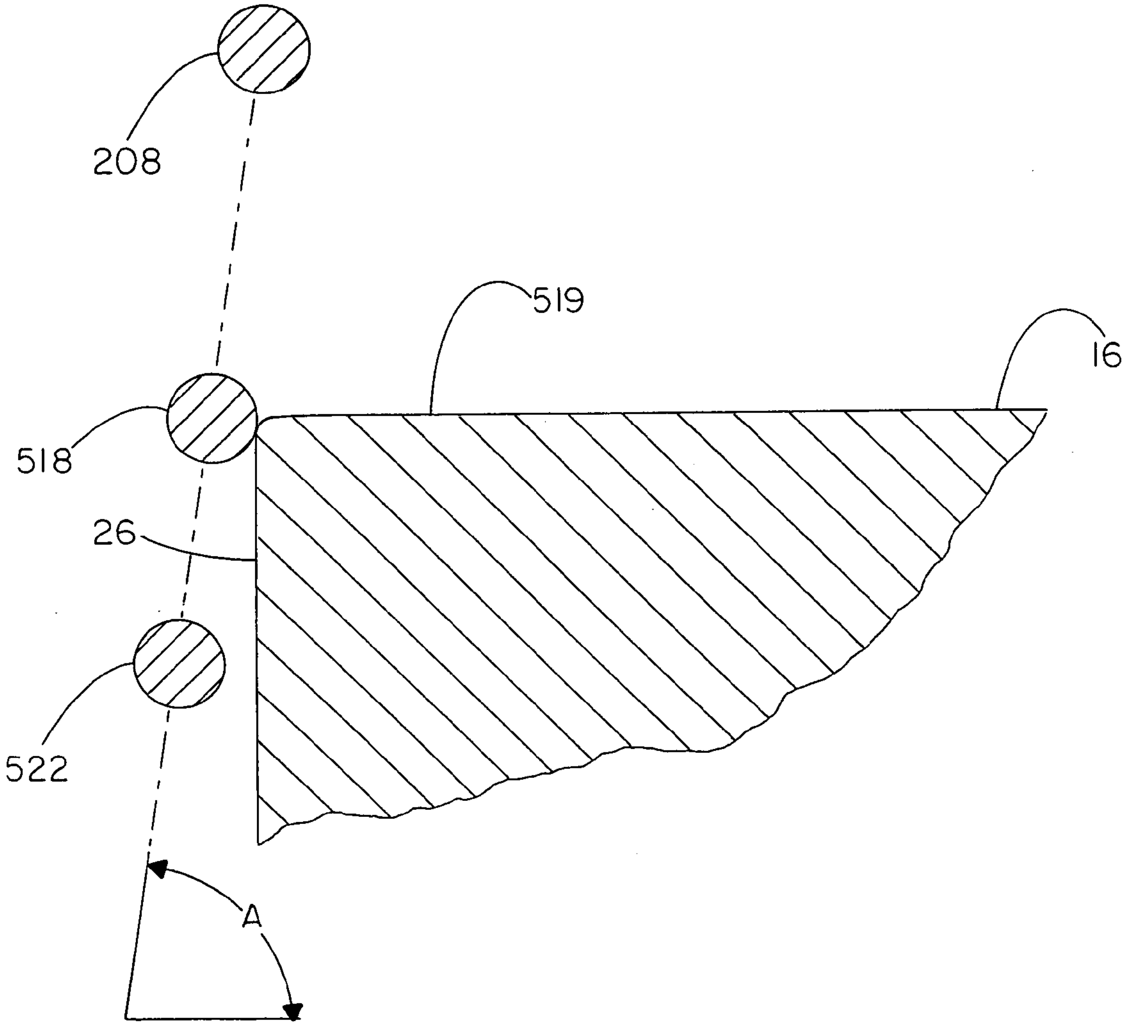
FIG. 24 is a diagrammatic view showing how tubing of the bed rail of FIG. 21 or FIG. 22 may be disposed in the plane of a sleeping surface of a mattress.

FIG. 24 shows that the preferred angle A (the angle between the leg portion and the rail portion) positions tubing 522 slightly away from the first side 26 of mattress 16, positions tubing 518 directly against the first side 26 of mattress 16 in the plane of the sleeping surface 519 so as to shut off any gap extending in a plane from said sleeping surface 519, and positions tubing 208 inwardly of the first side 26 of mattress 16 where first side 26 of mattress 16 defines a plane. Where the leg portions and rail portions have a greater acute angle, i.e. closer to a right angle relationship, tubing 522 may be set more closely to or directly against first side 26. In other words, tubing 208, 518 and 522 are generally in a common plane that intersects a plane defined by the first side 26 at a single line, with such single line being in the plane of the sleeping surface 519 and with tubing 518 preferably being co-axial with such line.

It can be appreciated that the sleeves 516 and 520 are elongate in height such that tubing 518 and 52.2 can be disposed at various heights via the second quick connect 534 while minimizing a change in the layout or form of sheeting 504.

The length of tubing 518 is about the distance between side tubes 216 and 218 and such entire length lies in the plane 519 of the sleeping surface of mattress 16. If tubing 518 is disposed above such plane, then a gap may form in the plane and below such plane. If tubing 518 is disposed below such plane, then a gap may form in the plane and below the plane to the height of the tubing 518. If such entire length is broken, then a gap may form at the discontinuous portion. If tubing 518 is disposed at an angle relative to the plane of the sleeping surface 519, then a gap is generated at all locations except where the tubing 518 breaks the plane of the sleeping surface 519.

The present invention includes, in combination, a bed rail 200 and a button mechanism that controls sliding between two sliding members 406, 250 in the bed rail 200. The combination includes a) a first outer member 406 having a first opening 412, with the first opening having two opposing first and second edges; b) a second inner member 250 having a second opening 480, with the second member 250 slideably engaged with the first member 406, with the second opening 480 having two opposing first and second edges; c) a depressable button 402 engaged to the second inner member 250, with the button 402 extendable through the first and second openings 412, 480, with the button 402 having an inclined surface 158 such that when the first edge of the first opening 412 confronts said inclined surface 158 said first edge of the first opening 412 runs over said inclined surface 158 and simultaneously depresses the button 402 into the second inner member 250 such that the first outer member 406 and second inner member 250 can slide automatically relative to each other in a first direction, with the button 402 having an upright vertically extending first surface 160 such that when the second edge of the first opening 412 confronts said upright vertically extending first surface 160 said second edge of the first opening 412 is stopped by said vertically extending first upright surface 160 of said button 402 such that the first outer member 406 and second inner member 250 cannot slide automatically relative to each other in a second direction; d) wherein the depressable button 402 further includes an upright vertically extending second surface 470; e) wherein said first outer member 406 and second inner member 250 cannot slide automatically relative to each other in the second direction when 1) the second edge of the first opening 412 engages the vertically extending first upright surface 160 of said button 402 and 2) the first edge of the second opening 480 engages the vertically extending second upright surface 470 of said button 402; f) wherein said first outer member 406 and second inner member 250 can slide automatically relative to each other when the first edge of the first opening 412 engages the inclined surface 158 of the depressable button 402; g) wherein said first outer member 406 includes a plurality of first openings 412 such that the button 402 can slide automatically from one first opening 412 to a second first opening 412; h) wherein the bed rail 200 comprises a rail portion 204 engaged to a leg portion 202, wherein the leg portion 202 comprises the first outer member 406 and second inner member 250; and i) wherein said depressable button 402 is oriented in said second inner member 250 such that: I. said first outer member 406 and second inner member 250 can slide automatically to decrease a length of said leg portion 202; II. said first outer member 406 and second inner member 250 cannot slide automatically to increase a length of said leg portion 202; and III. said depressable button 402 must be depressed to permit first outer member 406 and second inner member 250 to slide relative to each other to increase a length of said leg portion 202. The depressable button 402 includes a head 478 and a spring 472, with the head 478 including the inclined surface 158, the upright vertically extending first surface 160, the upright vertically extending second surface 470, with the spring 472 comprising a base arm 474 and an upper arm 476, and with the head 478 and spring 472 being one-piece.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

We claim:

1. In combination, a bed rail and a button mechanism that controls sliding between two sliding members in the bed rail, comprising:

a) a first outer member having a first opening, with the first opening having two opposing first and second edges;

b) a second inner member having a second opening, with the second member slideably engaged with the first member, with the second opening having two opposing first and second edges;

c) a depressable button engaged to the second inner member, with the button extendable through the first and second openings, with the button having an inclined surface such that when the first edge of the first opening confronts said inclined surface said first edge of the first opening runs over said inclined surface and simultaneously depresses the button into the second inner member such that the first outer member and second inner member can slide automatically relative to each other in a first direction, with the button having an upright vertically extending first surface such that when the second edge of the first opening confronts said upright vertically extending first surface said second edge of the first opening is stopped by said vertically extending first upright surface of said button such that the first outer member and second inner member cannot slide automatically relative to each other in a second direction;

d) wherein the depressable button further includes an upright vertically extending second surface;

e) wherein said first outer member and second inner member cannot slide automatically relative to each other in the second direction when 1) the second edge of the first opening engages the vertically extending first upright surface of said button and 2) the first edge of the second opening engages the vertically extending second upright surface of said button;

f) wherein said first outer member and second inner member can slide automatically relative to each other when the first edge of the first opening engages the inclined surface of the depressable button;

g) wherein said first outer member includes a plurality of first openings such that the button can slide automatically from one first opening to a second first opening;

h) wherein the bed rail comprises a rail portion engaged to a leg portion, wherein the leg portion comprises the first outer member and second inner member; and i) wherein said depressable button is oriented in said second inner member such that:

I. said first outer member and second inner member can slide automatically to decrease a length of said leg portion;

II. said first outer member and second inner member cannot slide automatically to increase a length of said leg portion; and III. said depressable button must be depressed to permit first outer member and second inner member to slide relative to each other to increase a length of said leg portion.

2. The combination of claim 1, wherein said depressable button includes a head and a spring, with the head including the inclined surface, the upright vertically extending first surface, the upright vertically extending second surface, with the spring comprising a base arm and an upper arm, and with the head and spring being one-piece.

* * * * *